(12) United States Patent
Benson

(10) Patent No.: US 10,349,029 B2
(45) Date of Patent: *Jul. 9, 2019

(54) PHOTOGRAPHIC SCENE REPLACEMENT SYSTEM

(71) Applicant: Lifetouch Inc., Eden Prairie, MN (US)

(72) Inventor: Keith A. Benson, Eden Prairie, MN (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,887

(22) Filed: Nov. 9, 2017

(65) Prior Publication Data

US 2018/0167595 A1 Jun. 14, 2018

Related U.S. Application Data

(63) Continuation of application No. 14/292,267, filed on May 30, 2014, now Pat. No. 9,838,661.

(51) Int. Cl.
| | |
|---|---|
| *G06K 9/00* | (2006.01) |
| *H04N 9/75* | (2006.01) |
| *H04N 5/222* | (2006.01) |
| *H04N 5/272* | (2006.01) |
| *G06K 9/38* | (2006.01) |

(52) U.S. Cl.
CPC ............... *H04N 9/75* (2013.01); *G06K 9/38* (2013.01); *H04N 5/2224* (2013.01); *H04N 5/2226* (2013.01); *H04N 5/272* (2013.01)

(58) Field of Classification Search
None
See application file for complete search history.

(56) References Cited

U.S. PATENT DOCUMENTS

| | | | |
|---|---|---|---|
| 5,799,213 A | 8/1998 | Saar | |
| 7,834,894 B2 | 11/2010 | Swanson et al. | |
| 2008/0019576 A1 | 1/2008 | Senftner et al. | |
| 2010/0092030 A1 | 4/2010 | Oren | |
| 2013/0044466 A1 | 2/2013 | Scharer, III | |
| 2013/0243248 A1* | 9/2013 | Vonolfen | H04N 5/2224 382/103 |

* cited by examiner

*Primary Examiner* — Atiba O Fitzpatrick
(74) *Attorney, Agent, or Firm* — Xin Wen

(57) ABSTRACT

A photographic scene replacement system includes a photographic scene with a detectable pattern. The system operates to capture a digital photograph of a subject and the photographic scene having the detectable pattern with a digital camera when the subject is arranged between the digital camera and the photographic scene. The system also operates to process the digital photograph at least in part by automatically detecting the detectable pattern in the digital photograph, to distinguish the subject from the photographic scene in the digital photograph.

21 Claims, 31 Drawing Sheets

PHOTOGRAPHIC SCENE REPLACEMENT SYSTEM

CROSS REFERENCE TO RELATED APPLICATION

This application is a continuation of U.S. patent application Ser. No. 14/292,267, filed on May 30, 2014, entitled PHOTOGRAPHIC SCENE REPLACEMENT SYSTEM, the disclosure of which is hereby incorporated by reference in its entirety.

BACKGROUND

Portrait photographs are often taken with digital cameras in portrait studios or outside environments. One of the advantages that digital photography has over traditional film-based photography is that digital images can be further processed even after the camera has taken and stored the image. Because the digital image is stored as digital data that fully describes the digital image, digital processing can be used to manipulate that data in a wide variety of ways. Such digital processing includes background replacement technology. Background replacement technology typically operates to remove portions of an image associated with a background behind the subject, and to replace those portions of the image with one or more replacement images.

One example of a background replacement technology involves chroma key technology (also sometimes referred to as blue screen or green screen technology). The chroma key technology is a post-production technique for compositing or layering two images or video streams together based on color hues. There are limitations to chroma key technology, however. For example, it is difficult to accurately distinguish the subject from the background when the subject's clothing is similar in color to the selected background color. Additionally, variations in the background color, such as caused by wrinkles in the background material or shadows cast by the subject, can also make it difficult to properly distinguish the subject from the background.

SUMMARY

In general terms, this disclosure is directed to a photographic scene replacement system. In one possible configuration and by non-limiting example, the photographic scene replacement system includes a photographic scene with a detectable pattern. Various aspects are described in this disclosure, which include, but are not limited to, the following aspects.

One aspect is a method of photographing a subject, the method comprising: capturing a digital photograph of a subject and a photographic scene with a digital camera when the subject is arranged between the digital camera and the photographic scene, at least a portion of the photographic scene having a detectable pattern thereon; and processing the digital photograph at least in part by automatically detecting the detectable pattern in the digital photograph, to distinguish the subject from the photographic scene in the digital photograph.

Another aspect is a system for processing digital photographs, the system comprising: a processing device; and at least one computer readable storage device storing data instructions, which when executed by the processing device, cause the processing device to: detect a detectable pattern in a digital photograph associated with a photographic scene; and distinguish the photographic scene from a subject in the digital photograph based at least in part upon the detected pattern.

Yet another aspect is a photographic scene comprising at least one sheet, formed of one or more materials, including at least one patterned surface, the patterned surface comprising: a background portion having a substantially uniform background color; and a pattern of detectable features arranged on the background portion, the detectable features having at least two non-neutral colors different from the background color; wherein the patterned surface has a substantially neutral average color.

Yet another aspect is a photography station comprising: a digital camera; a photographic scene configured to be photographed by the digital camera, at least a portion of the photographic scene including a detectable pattern; and a computing device comprising: a processing device; and at least one computer readable storage device storing data instructions, which when executed by the processing device, cause the processing device to: detect the detectable pattern in a digital photograph associated with the photographic scene; and distinguish the photographic scene from a subject in the digital photograph based at least in part upon the detected pattern.

DETAILED DESCRIPTION

Figure 1:
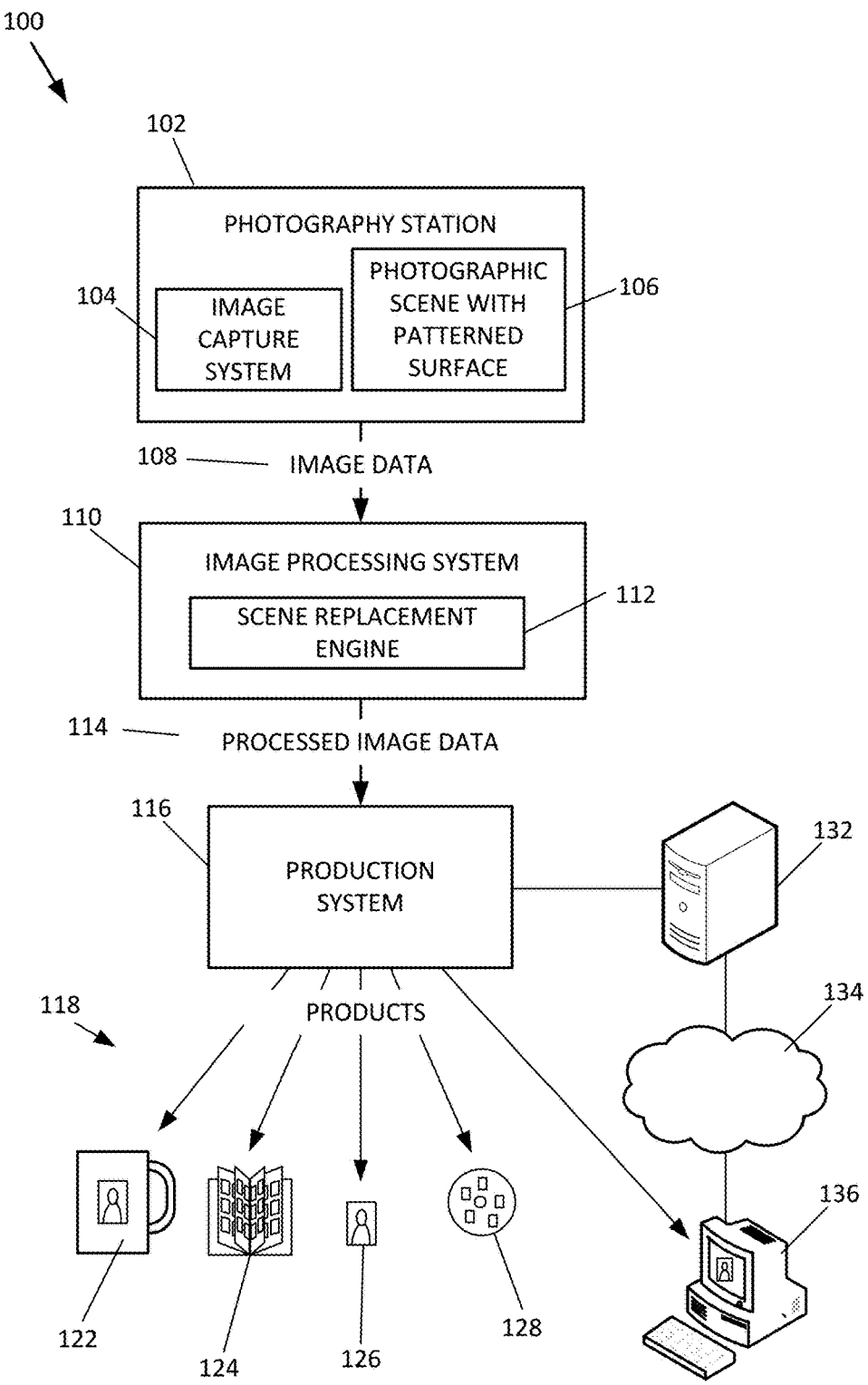
FIG. 1 is a schematic block diagram of an example system for capturing a subject.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of an example system 100 for capturing a subject. In this example, system 100 includes a photography station 102, an image capture system 104, a photographic scene 106, an original image data 108, an image processing system 110, a scene replacement engine 112, a processed image data 114, a production system 116, and products 118. In some embodiments, the photography station 102 is a portrait photography station that captures portraits of subjects, such as humans, animals, or inanimate objects.

The photography station 102 is a location where a digital image is captured with the image capture system 104. In some embodiments, the photography station 102 is a professional photography studio where subjects go to have their photograph taken. In other embodiments, the photography station 102 is a mobile photography studio, which is portable so that it can be set up at a remote location, such as in a school, a church, or other building or location. An example of the photography station 102 is illustrated and described in more detail with reference to FIG. 2.

The image capture system 104 operates to capture an image of one or more subjects in the photography studio. An example of the image capture system 104 is illustrated and described in more detail with reference to FIG. 3.

The photographic scene 106 is an area or scenery that appears behind the one or more subjects from the perspective of the image capture system 104, so that the photographic scene appears in the background of the image captured by the image capture system 104 of the one or more subjects. In some embodiments, at least part of the photographic scene 106 is also placed in front of the subjects and/or underneath the subjects as a floor, for example. In some embodiments, the scenes of the photographs are replaced with different image scenes or art work after the photographs have been captured. As described below, the photographic scene 106 is configured to at least partially automate the scene replacement and result in a high quality replacement.

The photographic scene 106 is made of at least one sheet that is formed of one or more materials. The photographic scene 106 includes at least one patterned surface 402. In some embodiments, the patterned surface 402 of the photographic scene 106 includes a background portion and a pattern of detectable features. The background portion has a substantially uniform background color. The pattern of detectable features is arranged to appear on the background portion. In some embodiments, the detectable features have at least two non-neutral colors different from the background color. In some embodiments, the patterned surface has a substantially neutral average color. An example of the photographic scene 106 is illustrated and described in more detail with reference to FIGS. 5-7.

The image data 108 is transferred to the image processing system 110. For example, the computer readable medium is brought to the image processing system 110, or is transported through a mail delivery system. In other embodiments, the image data 108 is transferred across a network, such as the Internet (e.g., network 134), or a local area network.

The image processing system 110 is a system that receives the image data 108 and processes the original image data 108 to generate the processed image data 114. In some embodiments, the image processing system 110 operates to store the processed image data 114 in a computer-readable medium. In some embodiments, the processed image data 114 includes the image data 108 as well as additional data that can be applied to the original image data 108. In other embodiments, the processed image data 114 includes only the additional data pertaining to the image data 108. In some of these embodiments, the original image data 108 is separately provided to production system 116.

The image processing system 110 operates to execute the scene replacement engine 112. The scene replacement engine 112 is configured to replace the photographic scene 106 with a replacement image 424 (FIG. 10). An example of the scene replacement engine 112 is illustrated and described in more detail with reference to FIGS. 9 and 10.

After the processed image data 114 has been generated, it is provided to the production system 116, which uses the processed image data 114 to produce one or more products 118. Examples of the products 118 include a photo mug 122, a picture book 124, a photograph 126, a computer-readable medium 128 storing digital image data, and digital images delivered across network 134. Other examples of products include a composite product (composed of multiple different images), a photo mouse pad, a collage, a key tag, a digital picture frame or digital key chain, a photo card (such as a student identification card, driver's license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image.

In some embodiments, production system 116 includes a web server 132 that is configured to communicate data across a network 134, such as to send products in the form of digital data to a client computing system 136. For example, in some embodiments, the web server 132 is in data communication with the network 134 and hosts a web site. The network 134 is a digital data communication network, such as the Internet, a local area network, a telephone network, or a smart phone network. A customer uses a client computing system 136 to communicate across the network 134, and accesses the web site of the server 132, such as by using a browser software application operating on the client computing system 136. In some embodiments, the customer can purchase products through the web site, or can access products that were previously purchased. The products can then be downloaded to the client computing system 136, where they are stored in memory. In some embodiments, the products continue to be hosted on the server 132, but the customer is provided with links that can be inserted into the customer's own web pages or on third party web sites (e.g., Facebook®, MySpace®, etc.) to allow others to view and/or download the products.

Figure 12:
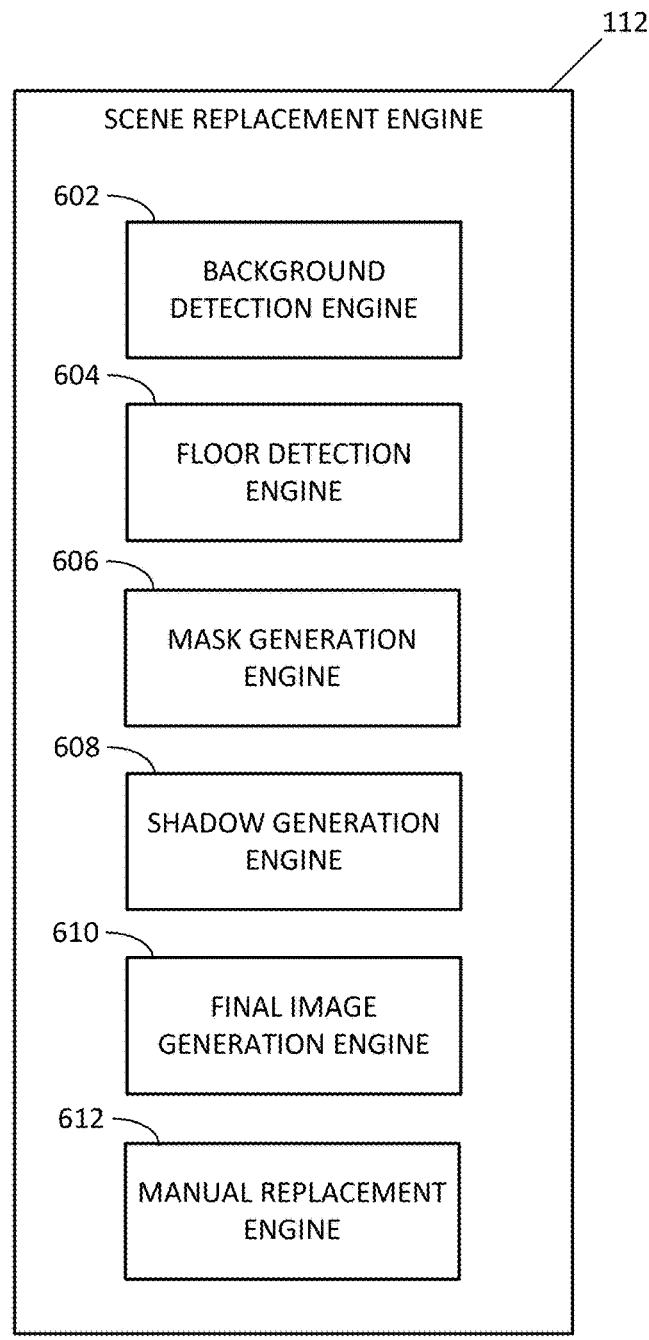
FIG. 12 illustrates an example scene replacement engine.

An example of the client computing system 136 is a computing device, such as illustrated in FIG. 12. Some embodiments include the client computing systems 136 in the form of a smart phone, a laptop computer, a handheld computer, a desktop computer, or other computing systems.

The above description of system 100 provides examples of some of the possible environments in which the image processing system 110 can be implemented. Other embodiments are implemented in yet other systems or environments. Any of the systems described herein can be implemented by one or more devices as additional embodiments.

Figure 2:
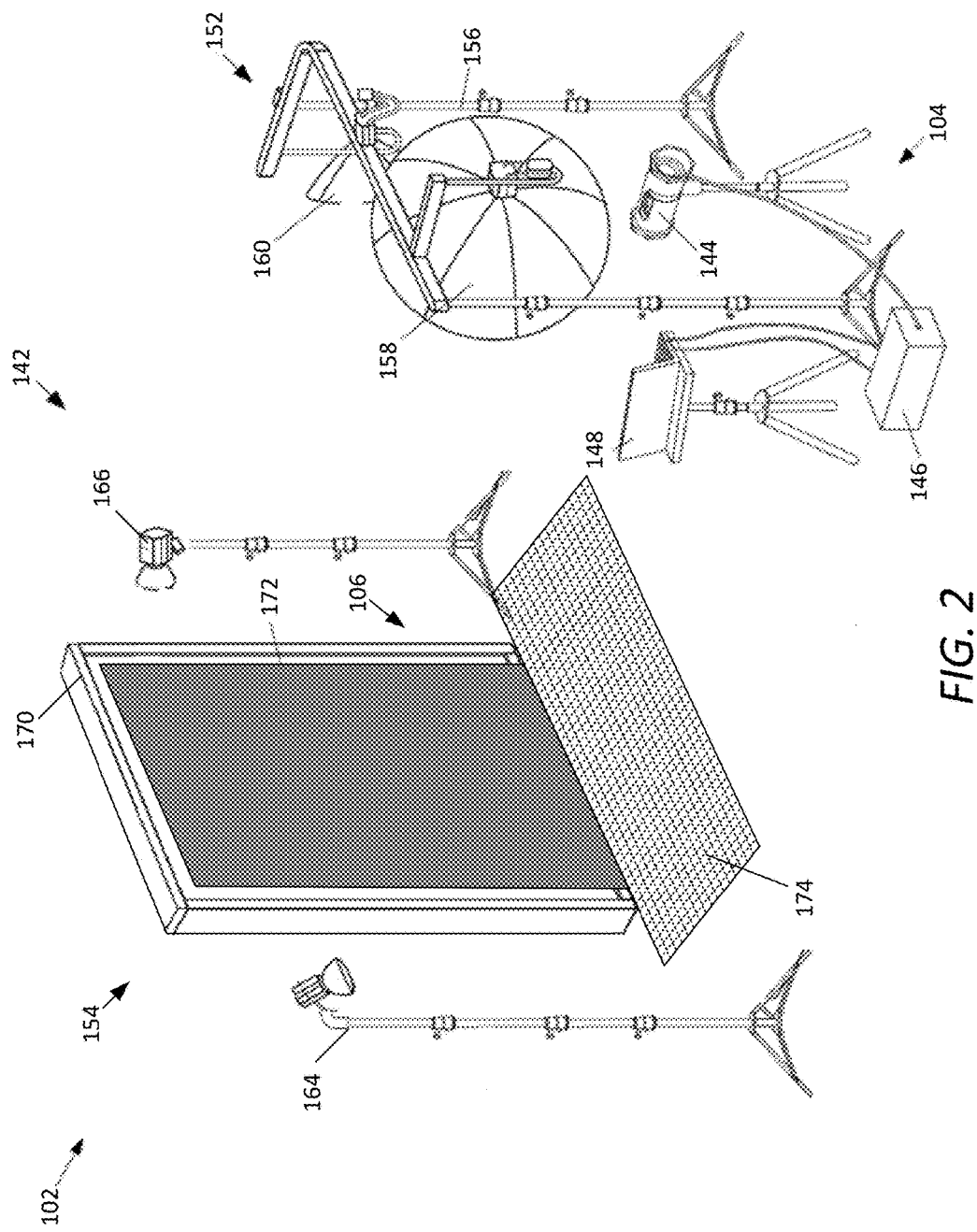
FIG. 2 is a schematic perspective diagram of an example photography station.

FIG. 2 is a schematic perspective diagram of an example photography station 102. In one example, the photography station 102 includes the image capture system 104 and a station assembly 142. In some embodiments, the image capture system 104 includes a camera 144, a controller 146, and a computing device 148. In some embodiments, the station assembly 142 includes a forward portion 152 and a rearward portion 154. The forward portion 152 includes, for example, a stand 156 that supports a main light 158 and a fill light 160. The rearward portion 154 includes, for example, a hair light device 164, a background light device 166, and a frame 170 that supports the photographic scene 106. In some embodiments, the photographic scene 106 includes a background scene 172 and a floor scene 174.

The image capture system 104 operates to capture an image of one or more subjects in the photography studio, and, in some embodiments, to control the overall operation of the photography station 102. For example, in some embodiments, the image capture system 104 performs setup checks to ensure that the photography station 102 is properly set up, to capture digital images of a subject, and to monitor the operation of the photography station 102 while the images are being captured to alert the photographer to potential problems.

The camera 144 is typically a digital camera that operates to capture digital images of one or more subjects. An example of camera 144 is described and illustrated in more detail herein with reference to FIG. 3.

The camera 144 is typically mounted on a tripod or other support structure. In some embodiments, the height of the camera 144 is adjusted by a motor coupled to a shaft of the tripod. When the motor rotates, the shaft of the tripod extends or contracts to raise or lower the camera 144. In some embodiments, the camera 144 is mounted to the shaft at a fixed and non-variable angle relative to the vertical shaft of tripod.

The controller 146 operates to control and coordinate the operation of various components of the photography station 102. An example of controller 146 is described in more detail with reference to FIG. 4.

In this example, the controller 146 is electrically connected to the camera 144, the computing device 148, and the lights 158, 160, 164, and 166, such as via one or more wires or data communication cables. In another possible embodiment, wireless communication is used to communicate between a wireless communication device of the controller 146 and a wireless communication device of one or more of the camera 144 and the lights 158, 160, 164, and 166. An example of a wireless communication protocol is the 802.11 a/b/g/n communication protocol. Other embodiments use a custom wireless communication protocol. Wireless communication includes radio frequency communication, infrared communication, magnetic induction communication, or other forms of wireless data communication.

The computing device 148 operates, in some embodiments, to interface with a user, such as the photographer. An example of the computing device 148 is described in more detail with reference to FIG. 12. In some embodiments, the computing device 148 generates a graphical user interface, such as to provide instructions to the user, warn the user of potential problems, display a live video feed preview from camera 144, and display an image after it has been captured.

The computing device 148 also operates to receive input from the user in some embodiments. In some embodiments, the computing device 148 includes a keyboard, a touch pad, a remote control, and a barcode scanner that receive input from the user.

In some alternate embodiments, one or more of the camera 144, the controller 146, and/or the computing device 148 are a single device. For example, in some embodiments, the camera 144 and the controller 146 are configured as a single device that captures digital images and performs control operations of controller 146. In another possible embodiment, the controller 146 and the computing device 148 are a single device. In yet another possible embodiment, the camera 144, the controller 146, and the computing device 148 are all a single device. Other combinations are used in other embodiments. Further, in yet other embodiments additional devices are used to perform one or more functions of these devices.

In some embodiments, the station assembly 142 generally includes the forward portion 152 and the rearward portion 154. The forward portion 152 is configured to be positioned in front of the subject when an image of a subject is captured. The rearward portion 154 is configured to be positioned behind the subject when an image of the subject is captured.

In this example, the forward portion 152 includes the stand 156 that supports the main light 158 and the fill light 160. Other embodiments include more or fewer lights. In some embodiments, the main and fill lights 158 and 160 include a flash bulb and a diffuser that surrounds the bulb. In other embodiments, the main and fill lights 158 and 160 are configured to provide continuous lighting for several purposes. For example, the continuous lighting is used for recording videos. The lights 158 and 160 are synchronized and controlled by controller 146.

The rearward portion 154 includes, for example, the hair light device 164, the background light device 166, and the frame 170 that supports the photographic scene 106.

The hair light 164 is typically arranged above and behind the subject to illuminate the top of the subject's head. The background light 166 is provided to illuminate the photographic scene 106. In this example, the background light 166 is arranged forward of the photographic scene 106. In other embodiments, the background light 166 is arranged behind the frame 170. The background light 166 is preferably arranged so that it does not significantly illuminate a side of the subject that is facing the camera 144.

The frame 170 is configured to hold the photographic scene 106 in place. In some embodiments, the photographic scene 106 is hung at a top portion of the frame 170. In other embodiments, the photographic scene 106 is supported by the frame 170 in any manner.

The photographic scene 106 provides an area or scenery behind the subjects standing in front of the image capture system 104. The subject is arranged between the image capture system 104 and the photographic scene 106. In some embodiments, the photographic scene 106 includes a background scene 172 and a floor scene 174. The photographic scene 106 is described and illustrated in more detail with reference to FIG. 5.

Figure 3:
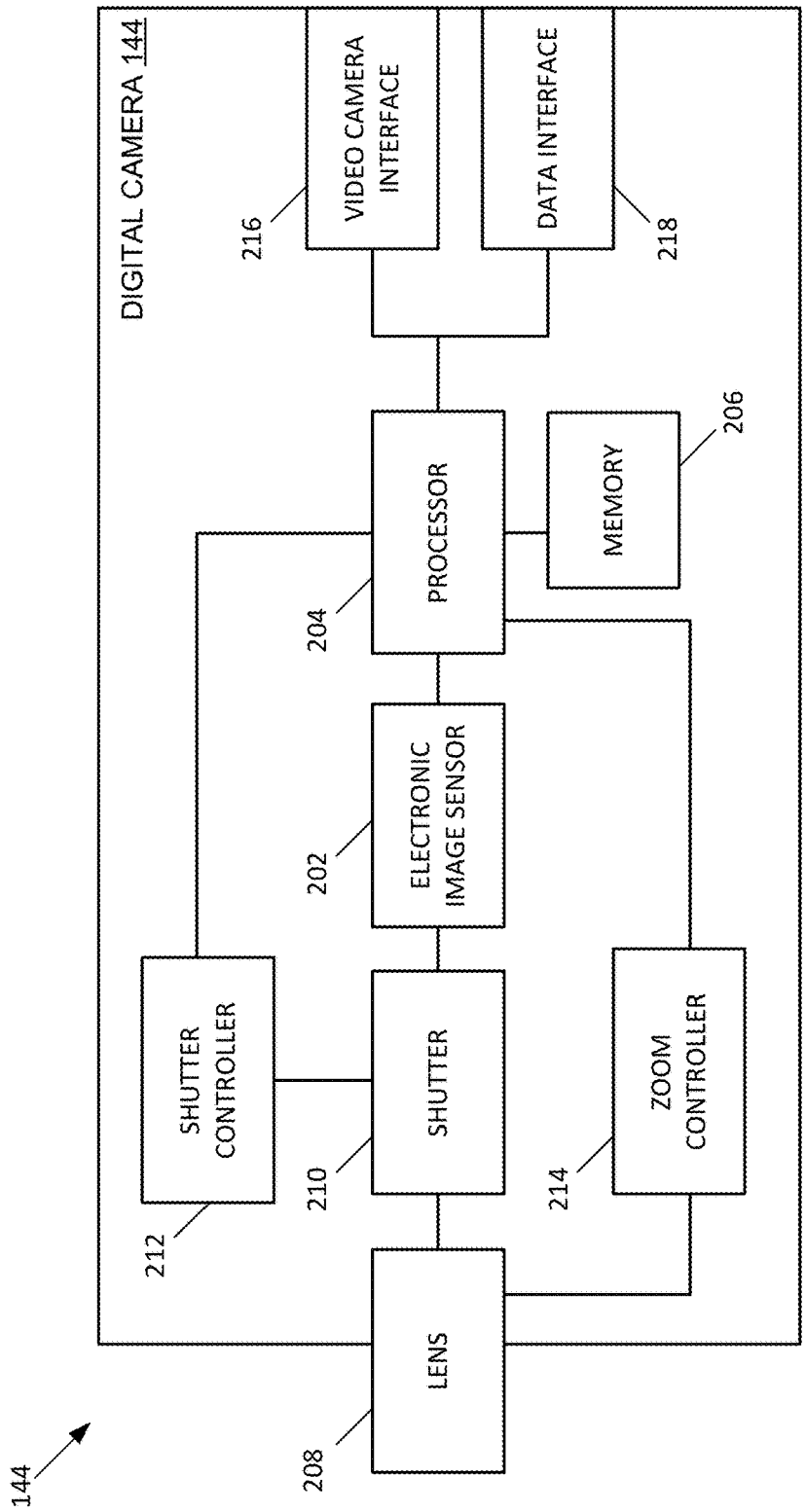
FIG. 3 is a schematic block diagram of an example camera.

FIG. 3 is a schematic block diagram of an example camera 144. The camera 144 is typically a digital camera including at least an electronic image sensor 202 for converting an optical image to an electric signal, a processor 204 for controlling the operation of the camera 144, and a memory 206 for storing the electric signal in the form of digital image data.

An example of the electronic image sensor 202 is a charge-coupled device (CCD). Another example of the electronic image sensor 202 is a complementary metal-oxide-semiconductor (CMOS) active-pixel sensor. The electronic image sensor 202 receives light from a subject and background and converts the received light into electrical signals. The signals are converted into a voltage, which is then sampled, digitized, and stored as digital image data in the memory 206.

The memory 206 can include various different forms of computer readable storage media, such as random access memory. In some embodiments, the memory 206 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 144 includes three main sections: a lens 208, a mechanical shutter 210, and a CCD element 202. Generally, the CCD element 202 has relatively rapid exposure speeds. However, the process of moving the captured image from the CCD element 202 to an image storage area such as the memory 206 is slower than the time to acquire the image. Accordingly, in order to reduce the time between acquiring the backlit and front-lit images as discussed herein—preferably to further reduce any motion of the foreground object in the time period between shots—some embodiments include a CCD element 202 that is an interline transfer CCD. Such elements are commercially available, and are manufactured by Eastman Kodak Company of Rochester, N.Y. under the designation KAI-11000. This type of CCD element 202 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short.

Thus, in some embodiments, the digital camera 144 can rapidly capture a first image, transfer the first image to a memory 206 (where it is temporarily stored) and then capture a second image. After the sequence of images, both of the images can be downloaded to the appropriate longer term memory location, such as a second memory device 206.

Since the CCD element 202 continues to integrate the second image while the first image is read out, a shutter 210 is employed in front of the CCD element 202. In some embodiments, a mechanical shutter 210 is used and is synchronized by the processor 204. The shutter 210 opens prior to the capture of the first image and remains open for the duration of the second flash. It then receives a signal to close in order to eliminate further exposure from ambient light. Examples of suitable shutters 210 are those that are commercially available and manufactured by Redlake MASD LLC of Tucson, Ariz. However, other shutters 210 may be employed in other embodiments. Further, the exposure may be controlled by the lights, shutter 210, and/or a combination of the two in some embodiments.

The lens 208 is located in front of the shutter 210 and is selected to provide the appropriate photographic characteristics of light transmission, depth of focus, etc. In some embodiments, the lens 208 is selected between 50 and 250 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in connection with the present invention.

To initiate the capture of the images, a remote control associated with the camera 144 can be used. In some embodiments, the remote control is connected to the controller 146, which generates a shutter release signal that is communicated to a shutter controller 212 of the camera 144. However, other embodiments use other methods and devices to initiate the image capture. For example, a button, switch or other device might be included on the controller 146 or connected to the camera 144. Still further, the computing device 148 is used in some embodiments to initiate the process.

A zoom controller 214 is also provided in some embodiments to mechanically adjust the lens 208 to cause the digital camera 144 to zoom in and out on a subject. In some embodiments, the remote control is used to zoom in and out on the subject. Signals from the remote control are communicated to the controller 146, which communicates the request to the zoom controller 214 of the digital camera 144. The zoom controller 214 typically includes a motor that adjusts the lens 208 accordingly.

In some embodiments, the digital camera 144 includes a video camera interface 216 and a data interface 218. The video camera interface 216 communicates live video data from the digital camera 144 to the controller 146 (or the computing device 148) in some embodiments. The data interface 218 is a data communication interface that sends and receives digital data to communicate with another device, such as the controller 146 or the computing device 148. For example, in some embodiments, the data interface 218 receives image capture messages from the controller 146 that instruct the digital camera 144 to capture one or more digital images. The data interface 218 is also used in some embodiments to transfer captured digital images from the memory 206 to another device, such as the controller 146 or the computing device 148. Examples of the video camera interface 216 and the data interface 218 are USB interfaces.

In some embodiments, the video camera interface 216 and the data interface 218 are the same, while in other embodiments they are separate interfaces.

Figure 4:
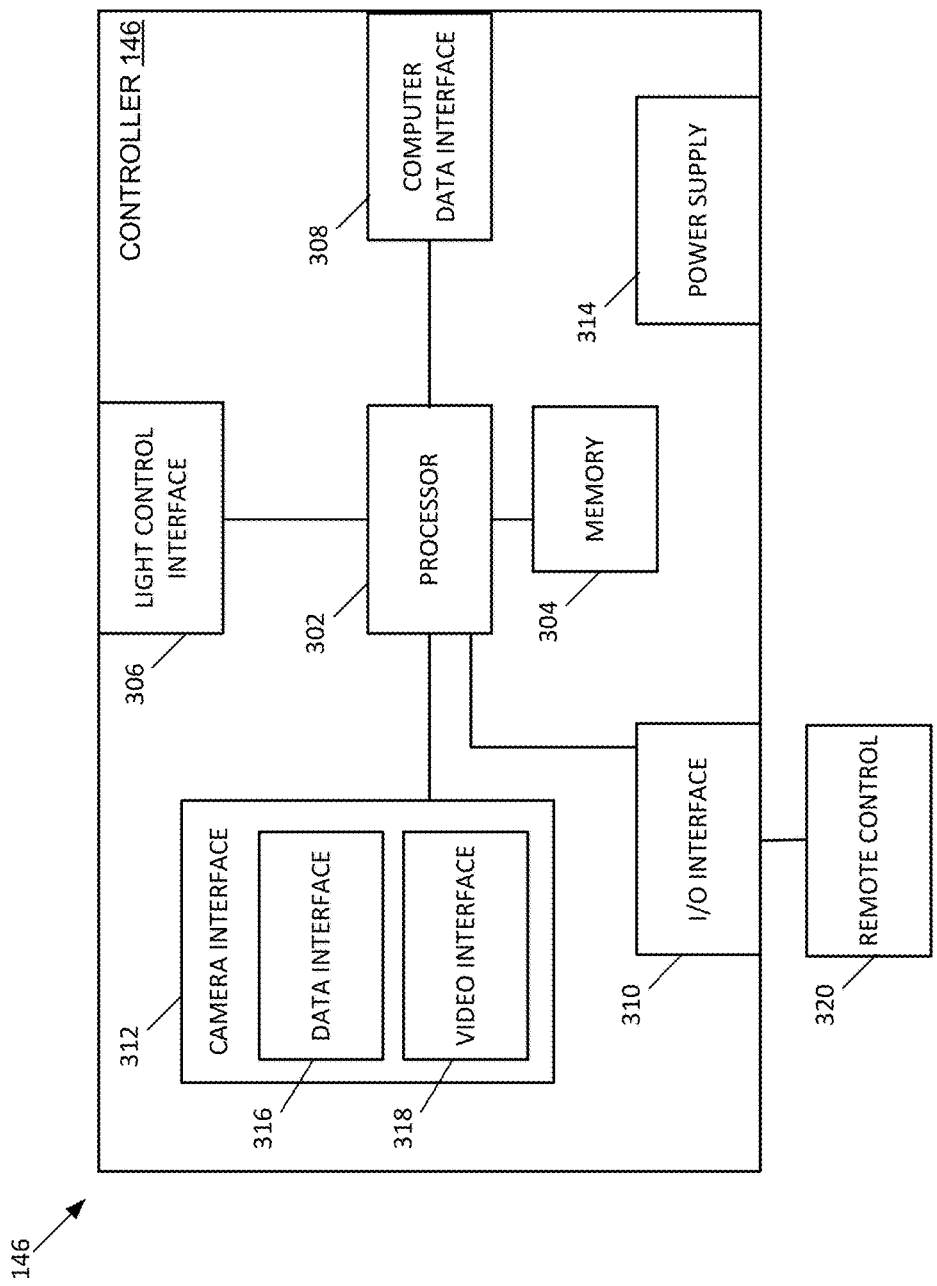
FIG. 4 is a schematic block diagram of an example controller.

FIG. 4 is a schematic block diagram of an example controller 146. In this example, the controller 146 includes a processor 302, a memory 304, a light control interface 306, a computer data interface 308, an input/output interface 310, a camera interface 312, and a power supply 314. In some embodiments, the camera interface 312 includes a data interface 316 and a video interface 318.

The processor 302 performs control operations of the controller 146, and interfaces with the memory 304. Examples of suitable processors and memory are described herein.

The light control interface 306 allows the controller 146 to control the operation of one or more lights, such as the main light 158, the fill light 160, the hair light 164, and the background light 166 (shown in FIG. 2). In some embodiments, the light control interface 306 is a send only interface that does not receive return communications from the lights. Other embodiments permit bidirectional communication. The light control interface 306 is operable to selectively illuminate one or more lights at a given time. The controller 146 operates to synchronize the illumination of the lights with the operation of the camera 144.

The computer data interface 308 allows the controller 146 to send and receive digital data with the computing device 148. An example of the computer data interface 308 is a universal serial bus interface, although other communication interfaces are used in other embodiments, such as a wireless or serial bus interface.

One or more input devices, such as a remote control 320, are coupled the processing device 302 through the input/output interface 310. The input devices can be connected by any number of the input/output interfaces 310 in various embodiments, such as a parallel port, serial port, game port, universal serial bus, or wireless interface.

The camera interface 312 allows the controller 146 to communicate with the camera 144. In some embodiments, the camera interface 312 includes a data interface 316 that communicates with the data interface 218 of the camera 144 (shown in FIG. 3), and a video interface 318 that communicates with the video camera interface 216 of the camera 144 (also shown in FIG. 3). Examples of such interfaces include universal serial bus interfaces. Other embodiments include other interfaces.

In some embodiments a power supply 314 is provided to receive power, such as through a power cord, and to distribute the power to other components of the photography station 102, such as through one or more additional power cords. Other embodiments include one or more batteries. Further, in some embodiments, the controller 146 receives power from another device.

In some embodiments, the controller 146 is arranged and configured to provide a single trigger pulse at the start of the integration of the first image. This pulse may be used by the controller 146 to synchronize the lights 158, 160, 164, and 166. In one embodiment, the front or rising edge is used to trigger the background light 166 and/or the hair light 164, while the trailing or falling edge can trigger the main light 158 and/or the fill light 160. Other types of triggers and pulses may be used. For example, the controller 146 uses two different pulses in some embodiments, etc. Yet other embodiments communicate digital messages that are used to synchronize and control the various operations.

The features of the photographic scene 106 and the processes therewith, as illustrated and described herein, are not limited to a particular configuration of the photography station 102, the camera 144, and the controller 146 as illustrated above. For example, the photographic scene 106 can be used with an image capturing process with a single exposure.

Figure 5:
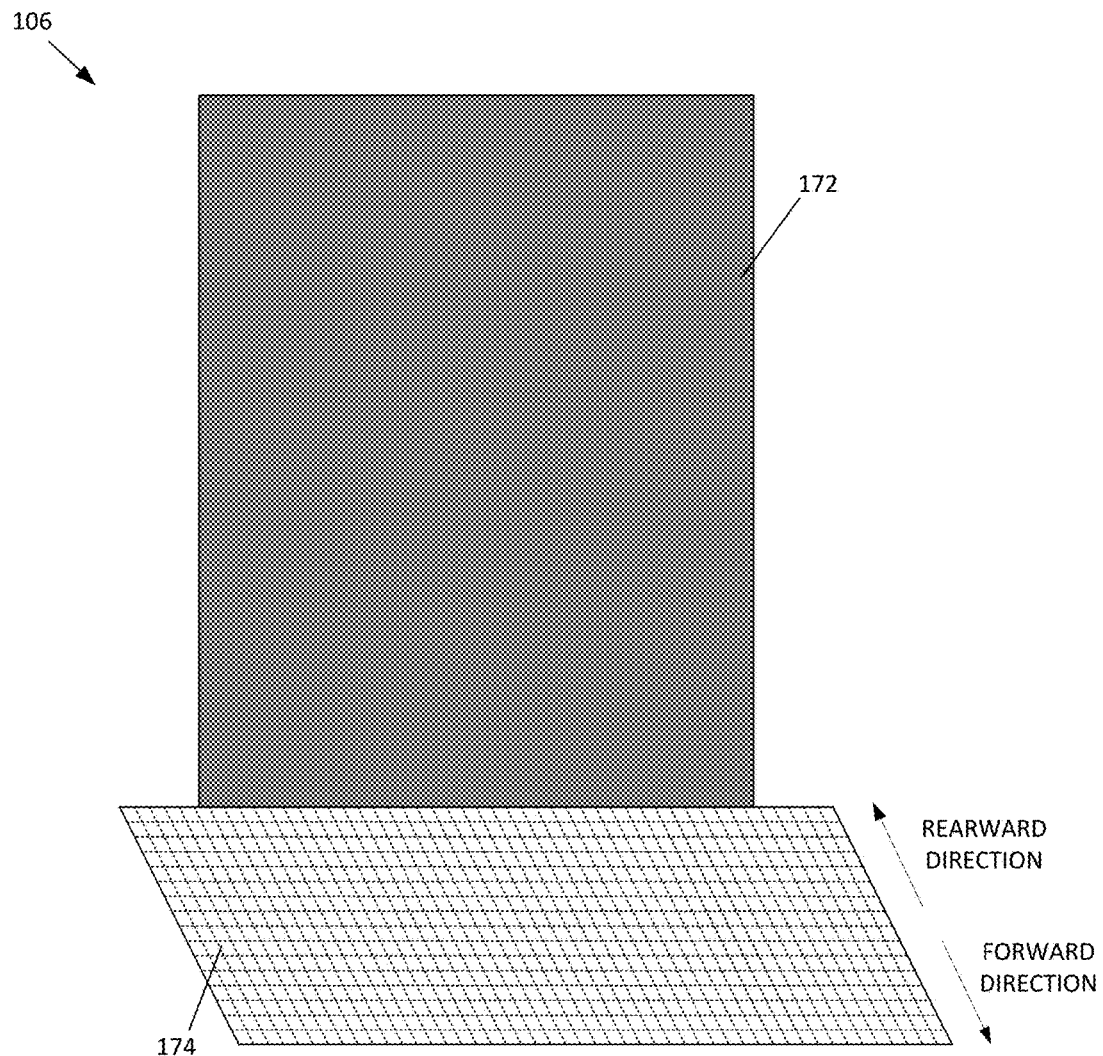
FIG. 5 is an example photographic scene.

FIG. 5 is an example photographic scene 106. In some embodiments, the photographic scene 106 includes a background scene 172 and a floor scene 174.

In some embodiments, at least a portion of the photographic scene 106 has a detectable pattern thereon. As described below, in the depicted example, the detectable pattern is formed on the floor scene 174 while the background scene 172 does not include any detectable pattern. The original photograph 420 (FIG. 10) that is captured with the digital camera 144 is processed to distinguish the subject from the photographic scene 106 in the original photograph 420. Such a process is performed by automatically detecting the detectable pattern in the original photograph 420, as described below.

In some embodiments, the detectable pattern is a visible pattern. In other embodiments, the detectable pattern is any pattern that can be detected by a digital camera or other device. Additional tools or instruments, such as filters or prisms, can be used to assist the cameras or devices in capturing the pattern. The detectable pattern may or may not be visible to the human eye. For example, a pattern that is configured to reflect wavelengths outside a visible spectrum, such as infrared, X-ray, or ultraviolet light can be used in some embodiments.

The background scene 172 is typically a sheet of one or more materials that is arranged behind the subject while an image of the subject is captured. In some embodiments, the background scene 172 has no detectable pattern or fabric texture. In some embodiments, the background scene 172 has a monochromatic color. For example, the background scene 172 has a color, such as gray, that does not substantially add color to the subject in a digital image. In other embodiments, the background scene 172 has a saturated color, such as saturated blue or green, which is suitable for a predetermined image process, such as chroma key compositing.

In some embodiments, the background scene 172 is made to be translucent so that at least some of the light from the background light 166 is allowed to pass through when the background light 166 is arranged behind the background scene 172. An example of a suitable material for the background scene 172 is a rear projection screen material. Other embodiments illuminate the background 172 from the front (but behind the subject), such that the background 172 need not be translucent. An example of a suitable background material for front illumination is a front projection screen material.

The floor scene 174 is a sheet of one or more materials that is arranged under the subject while an image of the subject is captured. The floor scene 174 has a predetermined pattern, as described below.

The floor scene 174 is considered to be distinguished from the background scene 172 in several aspects. For example, the subject is physically in contact with the floor scene 174 while the subject is not necessarily in contact with the background scene 172. Thus, the floor scene 174 causes more color casts on the subject than the background scene 172, and thus contaminates the color of the subject close to the floor scene 174. Such color cast or contamination on the part of the subject reduces color difference between the floor scene 174 and the subject, thereby making it unreliable to use typical scene replacement techniques, such as chromakey compositing, on the floor scene replacement. For example, the color cast or reflection on the subject reduces the quality of the image and makes the image look unnatural when a replacement image is added to the image. Further, the subject can generate drop shadows on the floor scene while the subject hardly produces shadows onto the background scene. Moreover, the floor scene 174 can easily become dirty or damaged (e.g., scuffed or ripped) by the subject who is physically in contact with the floor scene 174. Because of these differences, the floor scene 174 is processed in different methods from the background scene 172, as described below. The floor scene 174 is illustrated and described in more detail with reference to FIGS. 6 and 7.

In some embodiments, the background scene 172 and the floor scene 174 are made as different sheets or pieces. In other embodiments, the background scene 172 and the floor scene 174 are made as one sheet or piece. In this example, the background scene 172 has no patterns while the floor scene 174 has predetermined patterns. In other embodiments, both the background scene 172 and the floor scene 174 have predetermined patterns. An example of the background scene 172 and the floor scene 174 is illustrated and described in more detail with reference to FIG. 5.

Figure 6:
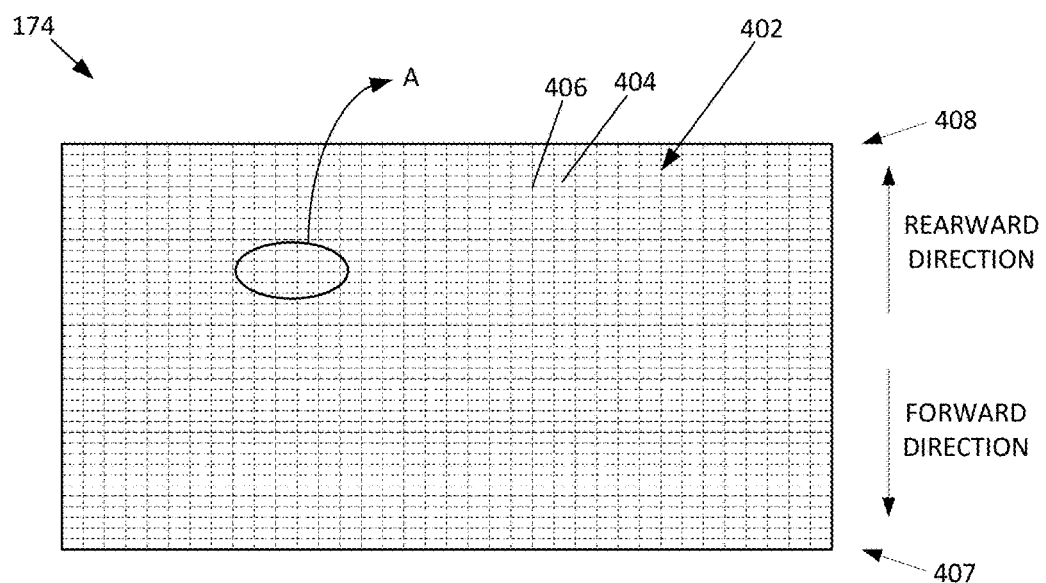
FIG. 6 is an example floor scene.

FIG. 6 is an example floor scene 174. The floor scene 174 includes a patterned surface 402. In some embodiments, the patterned surface 402 includes a background portion 404 and a pattern of detectable features 406. The floor scene 174 has a forward end 407 arranged close to the camera 144 and a rearward end 408 arranged away from the camera 144.

The floor scene 174 is at least one sheet made from one or more materials that are robust and have longer life span. Further, the floor scene 174 is configured to be sufficiently flexible so as to be rolled and unrolled conveniently for easing use and maintenance. In some embodiments, the floor scene 174 includes one or more substrates made from, for example, vinyl, rubber, or mouse pad type materials. In other embodiments, the floor scene 174 is made of any type of materials that minimize tear or wrinkle and are easy to use, carry, store, and clean. In some embodiments, the floor scene 174 is connected to the background scene 172. In other embodiments, the floor scene 174 is made as one piece with the background scene 172.

The patterned surface 402 includes a detectable pattern that is non-monochromatic and has a repeated design arranged on the floor scene 174. The patterned surface 402 is configured to be sufficiently differentiated from the subject located on the floor scene 174 so that the scene replacement engine 112 detects the floor scene 174 and separates the floor scene 174 from the subject. As described below, the patterned surface 402 ensures that the scene replacement engine 112 detects the floor scene 174 that is to be replaced with a replacement floor image 428 (FIG. 10) although the floor scene 174 is tainted or includes irregularity, such as scuffs or dirt.

The background portion 404 has a substantially uniform color C4. In some embodiments, the uniform color C4 of the background portion 404 is selected to sufficiently differentiate the background portion 404 from the subject. For example, the background portion 404 has a darker color that is not typically similar to colors of the clothing or shoes of the subject. In some embodiments, the color C4 of the background portion 404 has a green cast. In other embodiments, the color C4 of the background portion 404 has a blue cast.

The pattern of detectable features 406 is arranged on the patterned surface 402 to appear to be placed on the background portion 404. In some embodiments, the pattern of detectable features 406 has visible features. In other embodiments, the detectable features 406 are detected by certain types of cameras or devices suitable for detecting the features.

The detectable features 406 are arranged in a predetermined manner with a predetermine size. In some embodiments, the detectable features 406 are visible features having at least two non-neutral colors that are different from the background color. Non-neutral colors are colors that are easily distinguishable, conspicuous and detectable by the camera 144. In some embodiments, non-neutral colors are saturated and/or include strong chromatic content. An example of the pattern of detectable features 406 is illustrated and described with reference to FIG. 7.

In some embodiments, the patterned surface 402 has a substantially neutral average color. In particular, the patterned surface 402 appears to have substantially a neutral color on a large scale, such as when observed by the human eye at a location of the camera 144. The neutral average color of the patterned surface 402 operates to remove reflections of light onto the subject, which would otherwise contaminate the colors of the subject.

As opposed to the non-neutral colors, neutral colors are colors that lack strong chromatic content. For example, neutral colors are unsaturated and/or achromatic, which lacks hues. Examples of the neutral colors include white, black and gray. Further, neutral colors are colors that are easily modified by adjacent more saturated colors and thus appear to take on the hue complementary to the adjacent saturated colors. For example, a gray arranged next to a bright red will appear distinctly greenish.

In this example, the uniform color C4 of the background portion 404 and the non-neutral colors of the detectable features 406 are selected to make the patterned surface 402 as a whole appear to have the substantially neutral average color. Examples of the substantially neutral average color include a gray cast.

In some embodiments, the neutral characteristic of the patterned surface 402 is determined by the Commission Internationale de l'Eclairage (CIE), which quantifies the neutrality based upon human observers.

In other embodiments, the neutrality of the patterned surface 402 is defined by the CIE L*a*b* (CIELAB). The CIELAB is a color space specified by the CIE and describes all the colors visible to the human eye. The three coordinates of CIELAB represent the lightness of the color (L*=0 yields black and L*=100 indicates diffuse white), its position between red/magenta and green (a*, negative values indicate green and positive values indicate magenta), and its position between yellow and blue (b*, negative values indicate blue and positive values indicate yellow). In some embodiments, the color distance from neutral colors is measured using the a* and b* components as follows:

$$\text{Distance from Neutral} = \sqrt{a^{*2} + b^{*2}}$$

In some embodiment where the patterned surface 402 includes a plurality of dots 410, 412 and 414 and the background portion 404 as described above, the distance from neutral ranges from about zero to about ten to achieve the color neutrality of the patterned surface 420. In other embodiments, the distance from neutral is zero. In these cases, an illuminant with which the CIELAB is used is selected to be close to the flash lighting systems used in the photography station 102. In some embodiments, the illuminant is D50 for the CIELAB above.

Figure 7:
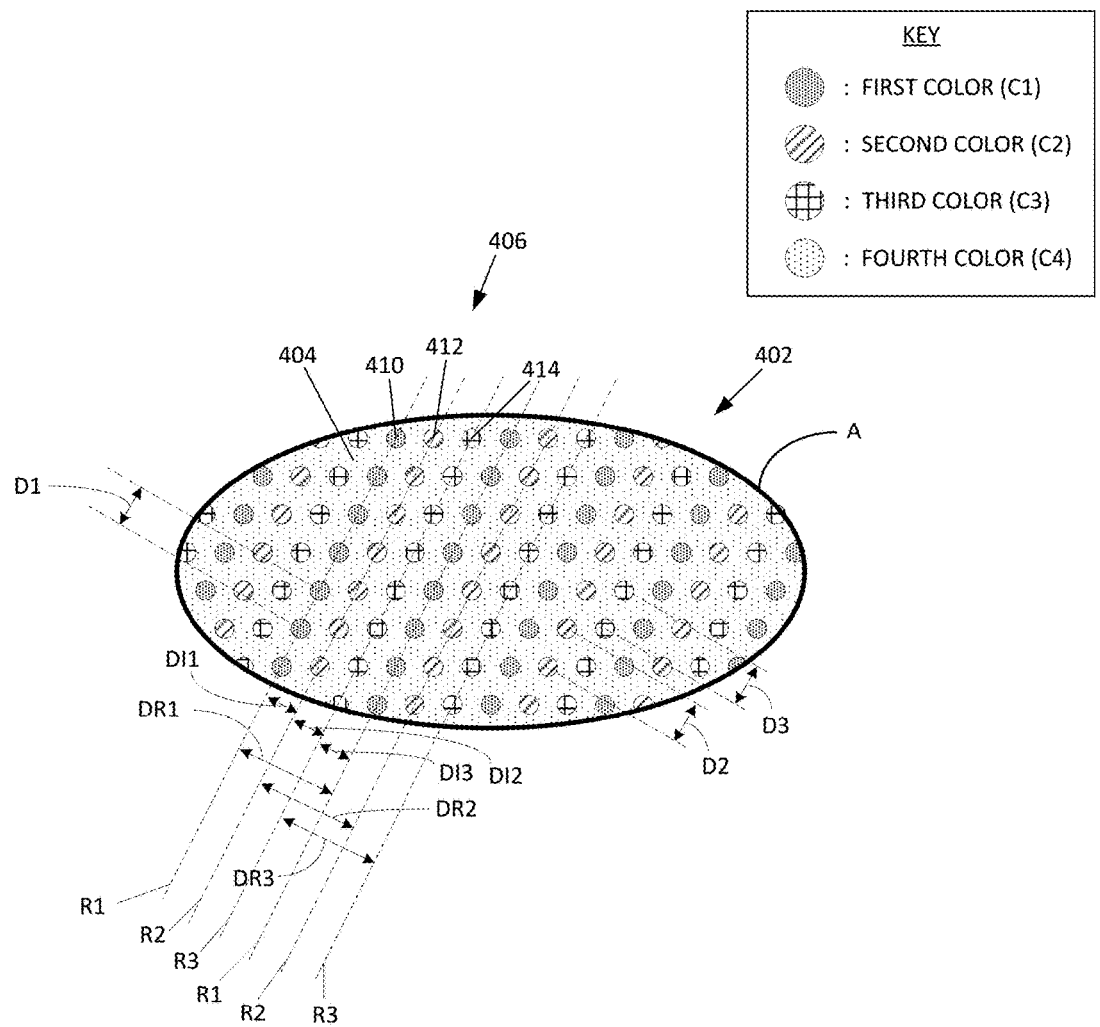
FIG. 7 is an enlarged view of an example patterned surface of the floor scene as shown in FIG. 6.

FIG. 7 is an enlarged view of an example patterned surface 402 of the floor scene 174 as shown in FIG. 6. As described above, the patterned surface 402 includes the background portion 404 and the pattern of detectable features 406. In some embodiments, the pattern of detectable features 406 includes a plurality of solid dots with three different colors. For example, the pattern of detectable features 406 includes a plurality of first dots 410, a plurality of second dots 412, and a plurality of third dots 414.

The first dots 410 have a first color C1 and form a plurality of first rows R1 on the background portion 404. In each first row R1, the first dots 410 are spaced apart at a first distance D1. The first rows R1 are spaced apart at a first row distance DR1.

The second dots 412 have a second color C2 and form a plurality of second rows R2 on the background portion 404. In each second row R2, the second dots 412 are spaced apart at a second distance D2. The second rows R2 are spaced apart at a second row distance DR2.

The third dots 414 have a third color C3 and form a plurality of third rows R3 on the background portion 404. In each third row R3, the third dots 414 are spaced apart at a third distance D3. The third rows R3 are spaced apart at a third row distance DR3.

In this example, the first, second and third colors C1, C2 and C3 are different from one another and from the color C4 of the background portion 404. As described above, the first, second and third colors C1, C2 and C3 are selected as non-neutral colors. In some embodiments, the first, second and third colors C1, C2 and C3 are magenta, cyan and yellow. In other embodiments, a different combination of three non-neutral colors is used for the first, second and third colors C1, C2 and C3.

The first, second and third rows R1, R2 and R3 are alternately arranged in parallel. For example, the first row R1 is arranged between the third and second rows R3 and R1 at a third distance DI3 (between the third and first rows R3 and R1) and at a first distance DI1 (between the first and second rows R1 and R2). Similarly, the second row R2 is arranged between the first and third rows R1 and R3 at the first distance DI1 (between the first and second rows R1 and R2) and at a second distance DI2 (between the second and third rows R2 and R3). Similarly, the third row R3 is arranged between the second and first rows R2 and R1 at the second distance DI2 and at the first distance DI1. In some embodiments, the first, second, and third distances DI1, DI2, and DI3 are the same.

Such an arrangement of the dots with different colors reduces a risk that the replacement algorithm performed by the scene replacement engine 112 mistakes the colors of the subject (e.g., clothing or shoe) for the floor scene 174.

Figure 8:
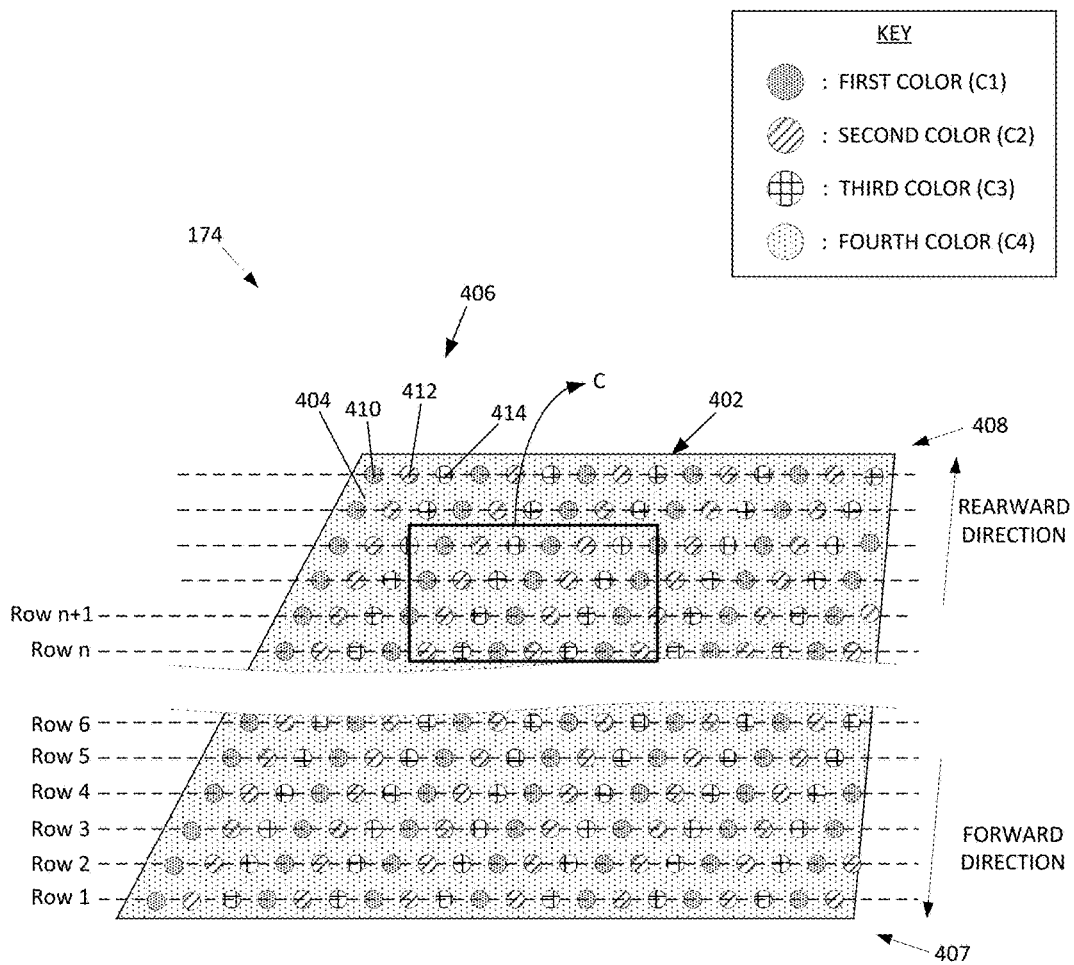
FIG. 8 is a schematic diagram of the patterned surface of the floor scene of FIG. 7 from a perspective of a camera.
Figure 9:
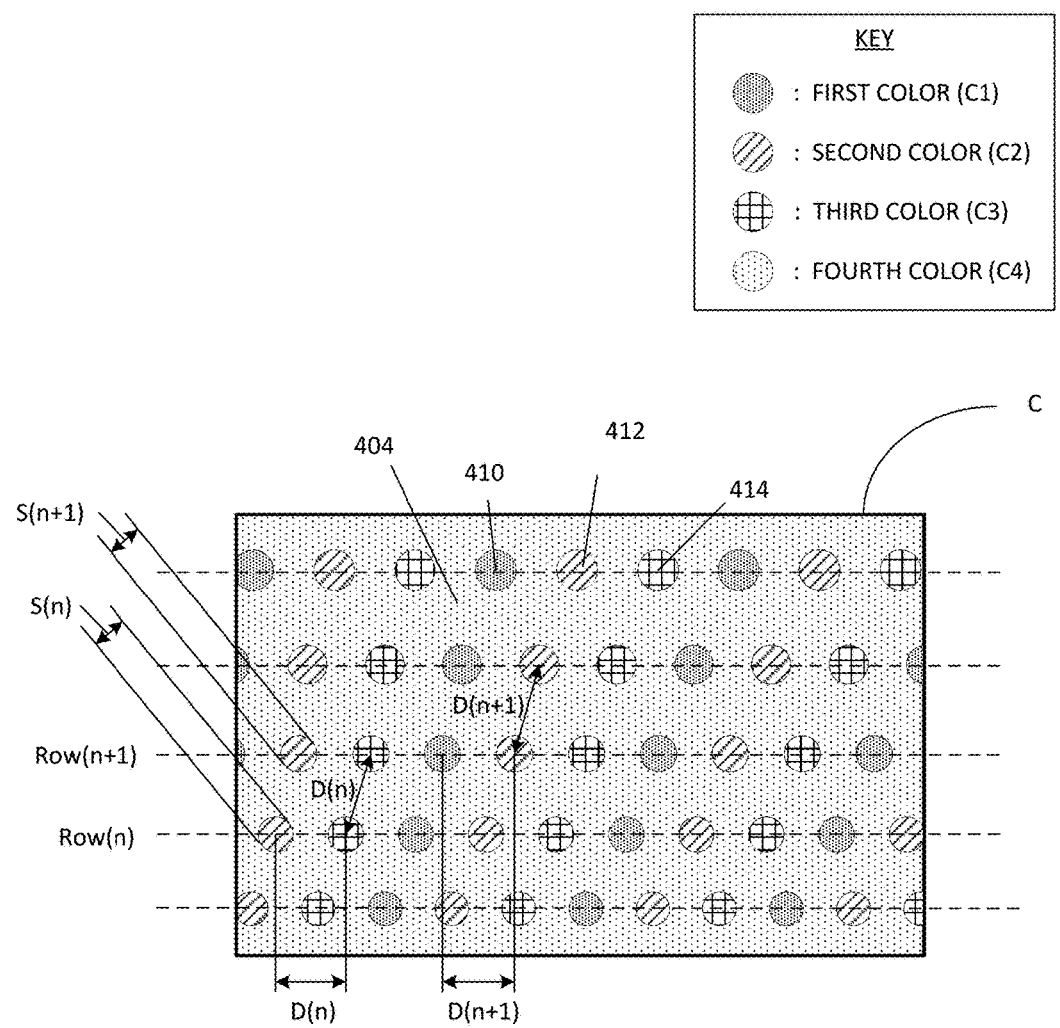
FIG. 9 is an exploded view of a portion of the patterned surface of FIG. 8.
Figure 10:
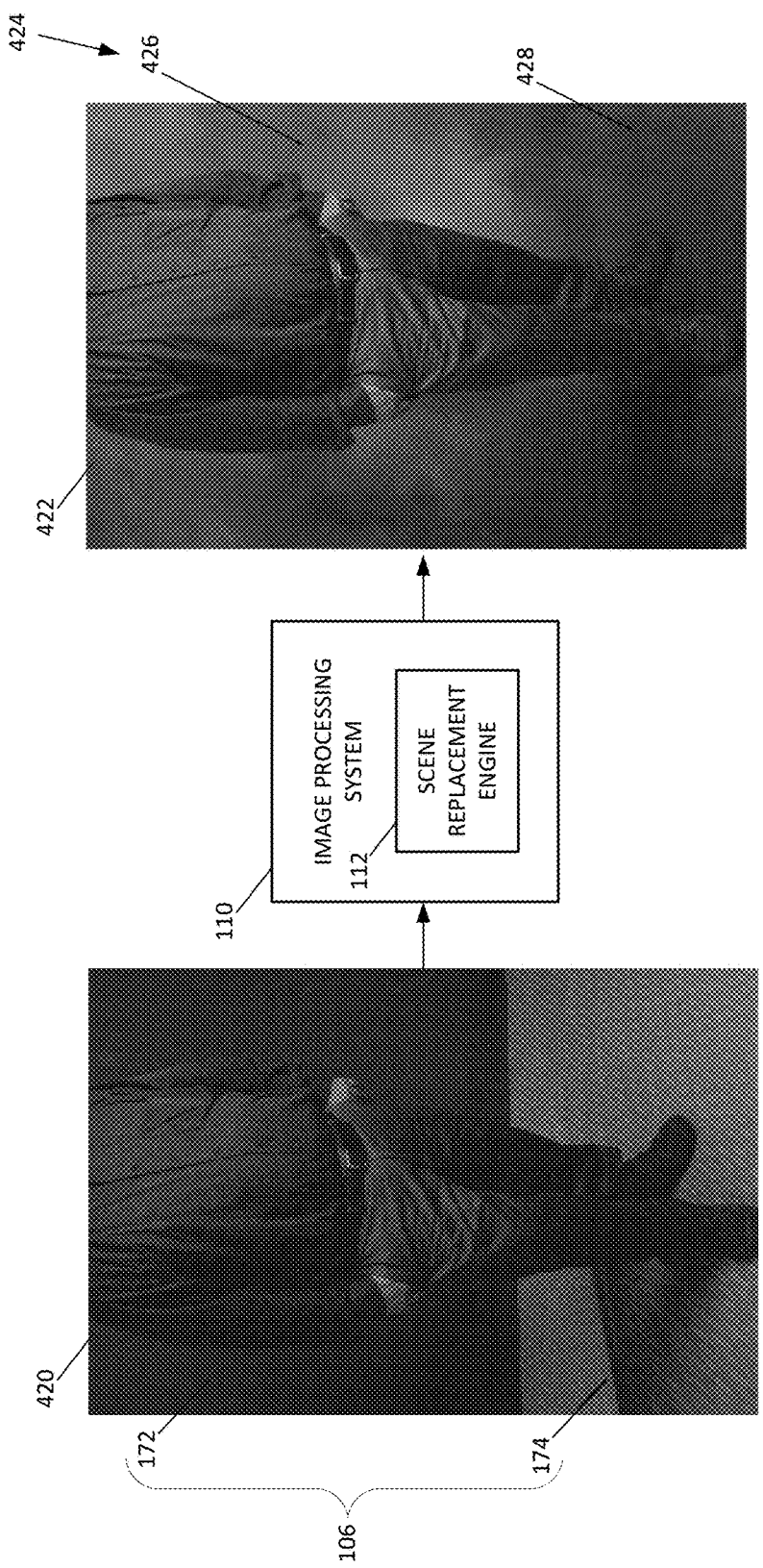
FIG. 10 is a schematic diagram illustrating an example image processing system with an example scene replacement engine.

FIGS. 8 and 9 illustrate an example configuration of dots 410, 412 and 414 of the patterned surface 402 of the floor scene 144.

FIG. 8 is a schematic diagram of the patterned surface 402 of the floor scene 174 from the perspective of the camera 144. The patterned surface 402 as depicted in FIG. 8 shows the arrangements and features of the dots 410, 412 and 414 when viewed from the standpoint of the camera 144. The patterned surface 402 from the camera's perspective have the features and dimensions as illustrated in FIG. 7. In particular, the the plurality of dots 410, 412 and 414 appear to have the same size and be arranged with the same distance among them, when viewed from the point of camera 144.

FIG. 9 is an exploded view of a portion C of the patterned surface 402 of FIG. 8. In some embodiments, the arrangement and feature of the patterned surface 402 varies from the forward end 407 (an end closest to the camera) to the rearward end 408 (an end farthest from the camera) of the floor scene 174 so that the patterned surface 402 appears consistent from the perspective of the camera 144.

In some embodiments, the plurality of dots 410, 412 and 414 are dimensioned to gradually change from the forward end 407 to the rearward end 408 in a rearward direction so that the dots 410, 412 and 414 appear to have consistent dimensions when captured by the camera 144. For example, the sizes of the dots 410, 412 and 414 gradually increase, and/or the shapes of the dots 410, 412 and 414 are gradually adjusted, from the forward end 407 to the rearward end 408 in the rearward direction. This configuration ensures that the patterned surface 402 appears to have the consistent size and shape of the dots 410, 412 and 414 between the forward end 407 and the rearward end 408 from the perspective of the camera 144. Thus, the captured original photograph includes the plurality of dots 410, 412 and 414 with consistent dimensions and measurements thereof and thus helps reliable execution of the scene replacement algorithm by the scene replacement engine 112.

In addition, or alternatively, the first, second and third distances D1, D2 and D3, and/or the first, second and third row distances DR1, DR2 and DR3, are configured to gradually change from the forward end 407 to the rearward end 408 in the rearward direction so that the dots 410, 412 and 414 appear to have consistent distances D1-D3 and DR1-DR3, respectively, when captured by the camera 144. For example, the distances between the dots 410, 412 and 414 gradually increase from the forward end 407 to the rearward end 408 in the rearward direction. This configuration also ensures the consistent dimensions and measurements associated with the dots 410, 412 and 414 in the captured original photograph, thereby helping the reliable execution of the scene replacement algorithm by the scene replacement engine 112.

As described above, in some embodiments, the sizes of the dots and/or the distances between them vary from the forward end 407 (an end closest to the camera) to the rearward end 408 (an end farthest from the camera) of the floor scene 174.

In some embodiments, the sizes of the dots 410, 412 and 414 are calculated as follows:

$$S(n)=a \times (b \times (\text{Row}(n)-1)+1)$$

where Row(n) is the $n^{th}$ row, and S(n) is a dot size in the $n^{th}$ row.

In some embodiments, the variable a ranges between 0.1 and 0.3, and the variable b ranges between 0.001 and 0.004. In other embodiments, the variable a is 0.190 and the variable b is 0.0025. In these cases, the dot sizes are measured in inches.

In some embodiments, the distance between the dots 410, 412 and 414 are calculated by the following equations. The distance can be measured between the starting edge of one dot and the starting edge of the next dot.

$$D(n)=x \times (y \times (\text{Row}(n)-1)+1)$$

where Row(n) is the $n^{th}$ row, and D(n) is a distance between dots in the $n^{th}$ row and between dots in the $n^{th}$ and $(n+1)^{th}$ rows.

In some embodiments, the variable x ranges between 0.2 and 0.5, and the variable y ranges between 0.001 and 0.004. In other embodiments, the variable x is 0.333 and the variable y is 0.0025. In these cases, the dot sizes are measured in inches.

As the sizes and distances become larger from the forward end 407 to the rearward end 408, the shape of the pattern will be trapezoid symmetrical about an axis extending between the forward and rearward ends 407 and 408.

In some embodiments, the sizes of the dots 410, 412 and 414 are configured to be as small as possible. The smallest dots 410, 412 and 414 permits the scene replacement engine 112 to more accurately distinguish the dots from the subject, thereby improving the capability of the scene replacement engine 112 for replacing the floor scene 174 with a replacement image 424 (FIG. 10). For example, where the original photograph 420 (FIG. 10) contains small holes or slashes of the floor scene 174 within the subject, the holes or slashes can be detected and separated from the subject if the dots 410, 412 and 414 are small enough for a predetermined number of the dots 410, 412 and 414 to be located within the holes or slashes. The sizes of the dots 410, 412 and 414 are determined based upon several factors. Such factors include, for example, the optical capability of the camera 144, such as the resolution of the camera 144.

Although, in this example, the pattern of detectable features 406 has three colored solid dots, the detectable features 406 can include solid dots with two colors in other embodiments. In yet other embodiments, the detectable features 406 include solid dots with more than three colors. The arrangements and principles of the solid dots with three different colors, as described above, are similarly applied to other embodiments of the detectable features 406 having solid dots with a different number of colors.

FIG. 10 is a schematic diagram illustrating an example image processing system 110 with an example scene replacement engine 112. In this example, the image processing system 110 executes the scene replacement engine 112 that processes the original photograph 420 to generate a final photograph 422 with a replacement scenic image 424. In particular, the scene replacement engine 112 is performed to replace the photographic scene 106 (including the background scene 172 and the floor scene 174) of the original photograph 420 with the replacement scenic image 424 (including a replacement background image 426 and a replacement floor image 428), thereby producing the final photograph 422. In some embodiments, the background scene 172 and the floor scene 174 is respectively replaced by the replacement background image 426 and the replacement floor image 428. In the depicted example, the photographic scene 106 is replaced as a whole with one piece of the replacement image 424.

Figure 11:
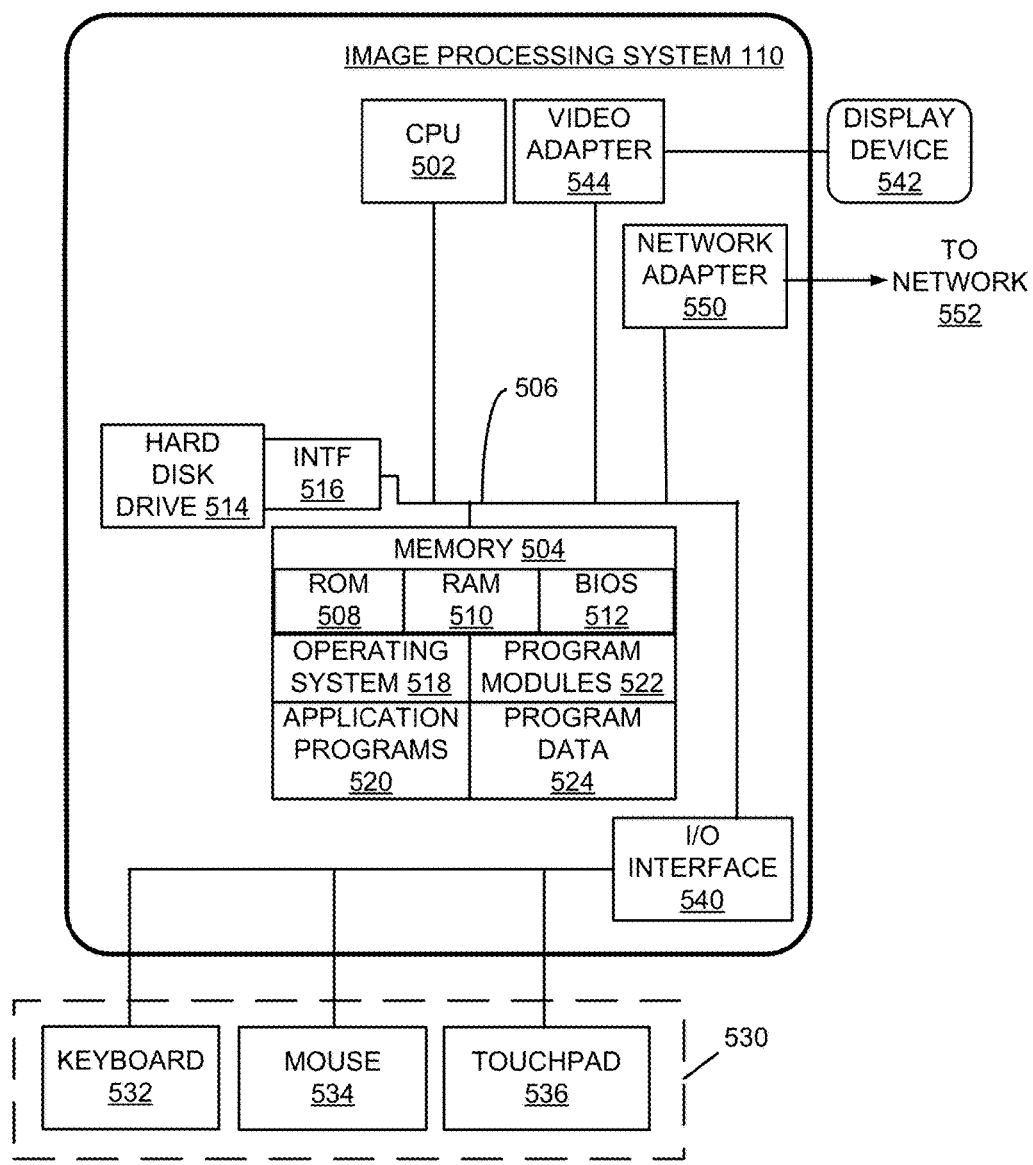
FIG. 11 is a schematic block diagram illustrating an architecture of the image processing system shown in FIG. 10.

FIG. 11 is a schematic block diagram illustrating an architecture of the example image processing system 110 shown in FIG. 10. In this example, the image processing system 110 is a computing device, such as a personal computer. In some embodiments, the image processing system 110 operates to execute the operating system, application programs, and software modules or engines described herein, such as the engines 112, 602, 604, 606, 608, 610, and 612 shown in FIG. 12.

The image processing system 110 includes, in some embodiments, at least one processing device 502. A variety of processing devices are available from a variety of manufacturers, for example, Intel or Advanced Micro Devices. In this example, the image processing system 110 also includes a system memory 504, and a system bus 506 that couples various system components including system memory 504 to the processing device 502. The system bus 506 is one of any number of types of bus structures including a memory bus, or memory controller; a peripheral bus; and a local bus using any of a variety of bus architectures.

The system memory 504 includes a read-only memory 508 and a random access memory 510. A basic input/output system 512, containing the basic routines that act to transfer information within the image processing system 110, such as during start up, is typically stored in the read-only memory 508.

The image processing system 110 also includes a secondary storage device 514 in some embodiments, such as a hard disk drive, for storing digital data. The secondary storage device 514 is connected to a system bus 506 by a secondary storage interface 516. The secondary storage devices 514 and their associated computer readable media provide nonvolatile storage of computer readable instructions (including application programs and program modules), data structures, and other data for image processing system 110.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, or read only memories.

A number of program modules can be stored in the secondary storage device 514 or the system memory 504, including an operating system 518, one or more application programs 520, other program modules 522, and a program data 524.

In some embodiments, a user provides inputs to the image processing system 110 through one or more input devices 530. Examples of the input devices 530 include a keyboard 532, a mouse 534, and a touchpad 536 (or a touch sensitive display). Other embodiments include other input devices 530. The input devices 530 are often connected to the processing device 502 through an input/output interface 540 that is coupled to the system bus 506. These input devices 530 can be connected by any number of input/output interfaces, such as a parallel port, serial port, game port, or a universal serial bus. Wireless communication between input devices and the interface 540 is possible as well, and includes infrared, BLUETOOTH® wireless technology, 802.11a/b/g/n wireless communication, cellular communication, or other radio frequency communication systems in some possible embodiments.

In this example embodiment, a display device 542, such as a monitor, liquid crystal display device, projector, or touch screen display device, is also connected to the system bus 506 via an interface, such as a video adapter 544. In addition to display device 542, the image processing system 110 can include various other peripheral devices (not shown), such as speakers or a printer.

When used in a local area networking environment or a wide area networking environment (such as the Internet), the image processing system 110 is typically connected to a network 552 through a network interface or adapter 550. Other possible embodiments use other communication devices. For example, some embodiments of the image processing system 110 include a modem for communicating across the network 552.

The image processing system 110 typically includes at least some form of computer-readable media. Computer readable media include any available media that can be accessed by the image processing system 110. By way of example, computer-readable media include computer readable storage media and communication media.

Computer readable storage media includes volatile and nonvolatile, removable and non-removable media implemented in any device configured to store information, such as computer readable instructions, data structures, the operating systems 518, the application programs 520, the program modules 522, the program data 524, or other data. The system memory 504 is an example of computer readable storage media. Computer readable storage media includes, but is not limited to, the read-only memory 508, the random access memory 510, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the image processing system 110.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

FIG. 12 illustrates an example scene replacement engine 112. In some embodiments, the scene replacement engine 112 includes a background detection engine 602, a floor detection engine 604, a mask generation engine 606, a shadow generation engine 608, a final image generation engine 610, and a manual replacement engine 612.

As described above, the scene replacement engine 112 operates to replace the photographic scene 106 with the replacement image 424 by utilizing the patterned surface 402 of the scene 106. In some embodiments, the scene replacement engine 112 is configured to detect the photographic scene 106, generate a mask for replacing the scene with a desired theme or replacement image 424, and produce the final photograph 422 with the replacement image 424.

The background detection engine 602 operates to detect the background scene 172 for replacement with the replacement background image 426. An example of the background detection engine 602 is illustrated and described with reference to FIG. 13.

The floor detection engine 604 operates to detect the floor scene 174 for replacement with the replacement floor image 428. An example of the floor detection engine 604 is illustrated and described with reference to FIG. 14.

The mask generation engine 606 operates to generate an image mask 960 (FIG. 27) for removing the photographic scene 106 from the original photograph 420 so as to obtain the subject only. An example of the mask generation engine 606 is illustrated and described with reference to FIG. 27.

The shadow generation engine 608 operates to generate a shadow image 974 (FIG. 28) from shadows cast on the photographic scene 106 in the original photograph 420. An example of the shadow generation engine 608 is illustrated and described with reference to FIG. 28.

The final image generation engine 610 operates to produce the final photograph 422 of the subject with the replacement image (background/floor) 424. An example of the final image generation engine 610 is illustrated and described with reference to FIG. 30.

The manual replacement engine 612 operates to supplement the automated operations for replacing the photographic scene 106 by the scene replacement engine 112. An example of the manual replacement engine 612 is illustrated and described with reference to FIG. 31.

Figure 13:
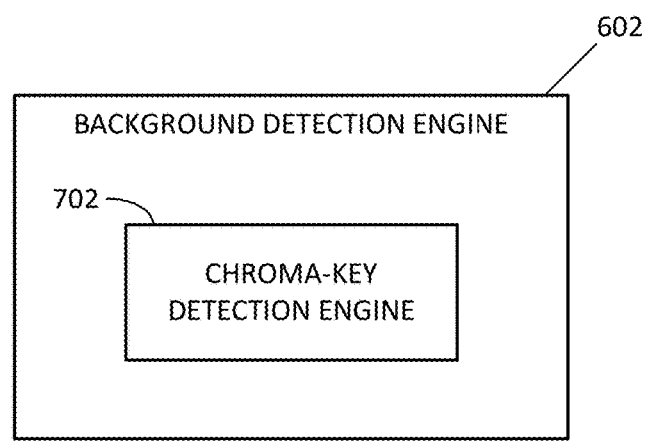
FIG. 13 illustrates an example background detection engine.

FIG. 13 illustrates an example background detection engine 602. In some embodiments, the background detection engine 602 includes a chroma key detection engine 702.

The chroma key detection engine 702 operates to detect the background scene 172 that has a saturated color, such as saturated blue or green, and generate a background scene mask 706 that will be used to replace the detected background scene 172 with the replacement background image 426. The background scene mask 706 is configured to remove the background scene 172 from the original photograph 420 and leave the subject 822, when the original photograph 420 passes through the background scene mask 706.

Figure 14:
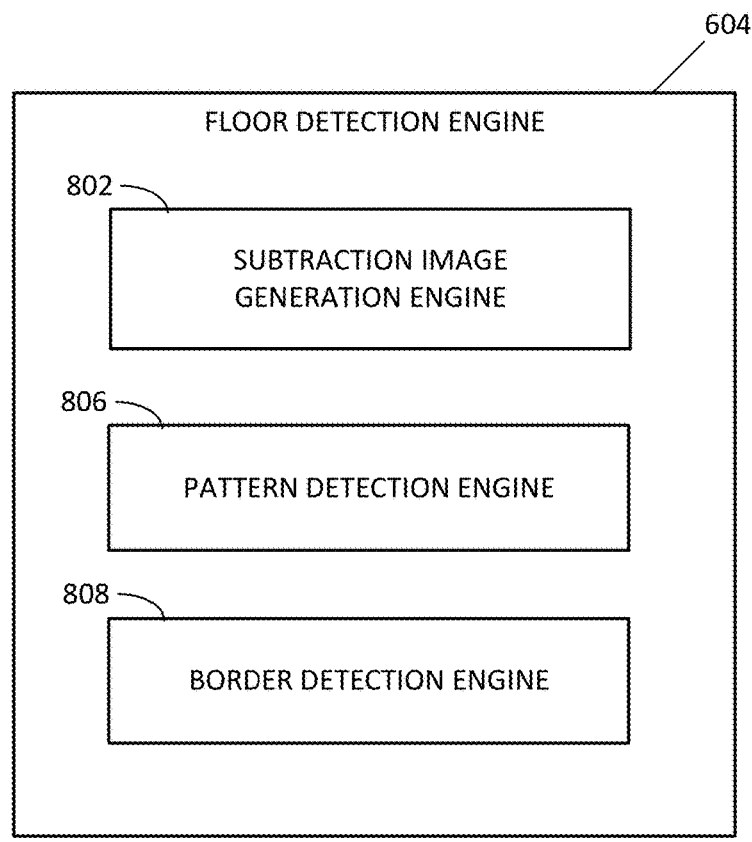
FIG. 14 illustrates an example floor detection engine.

FIG. 14 illustrates an example floor detection engine 604. In some embodiments, the floor detection engine 604 includes a subtraction image generation engine 802, a pattern detection engine 806, and a border detection engine 808.

The subtraction image generation engine 802 operates to generate a subtraction image 830 (FIG. 16) of the original photograph 420. The subtraction image 830 is used to detect the patterned surface 402 of the floor scene 174, as described below. An example operation of the subtraction image generation engine 802 is illustrated and described with reference to FIG. 18.

The pattern detection engine 806 operates to detect the patterned surface 402 of the floor scene 174 with the subtraction image 830 and/or the original photograph 420. An example operation of the pattern detection engine 806 is illustrated and described with reference to FIG. 20.

The border detection engine 808 operates to detect the pattern of detectable features 406 at or around the boundaries 826 between the subject 822 and the floor scene 174. An example operation of the border detection engine 808 is illustrated and described with reference to FIG. 25.

Figure 15:
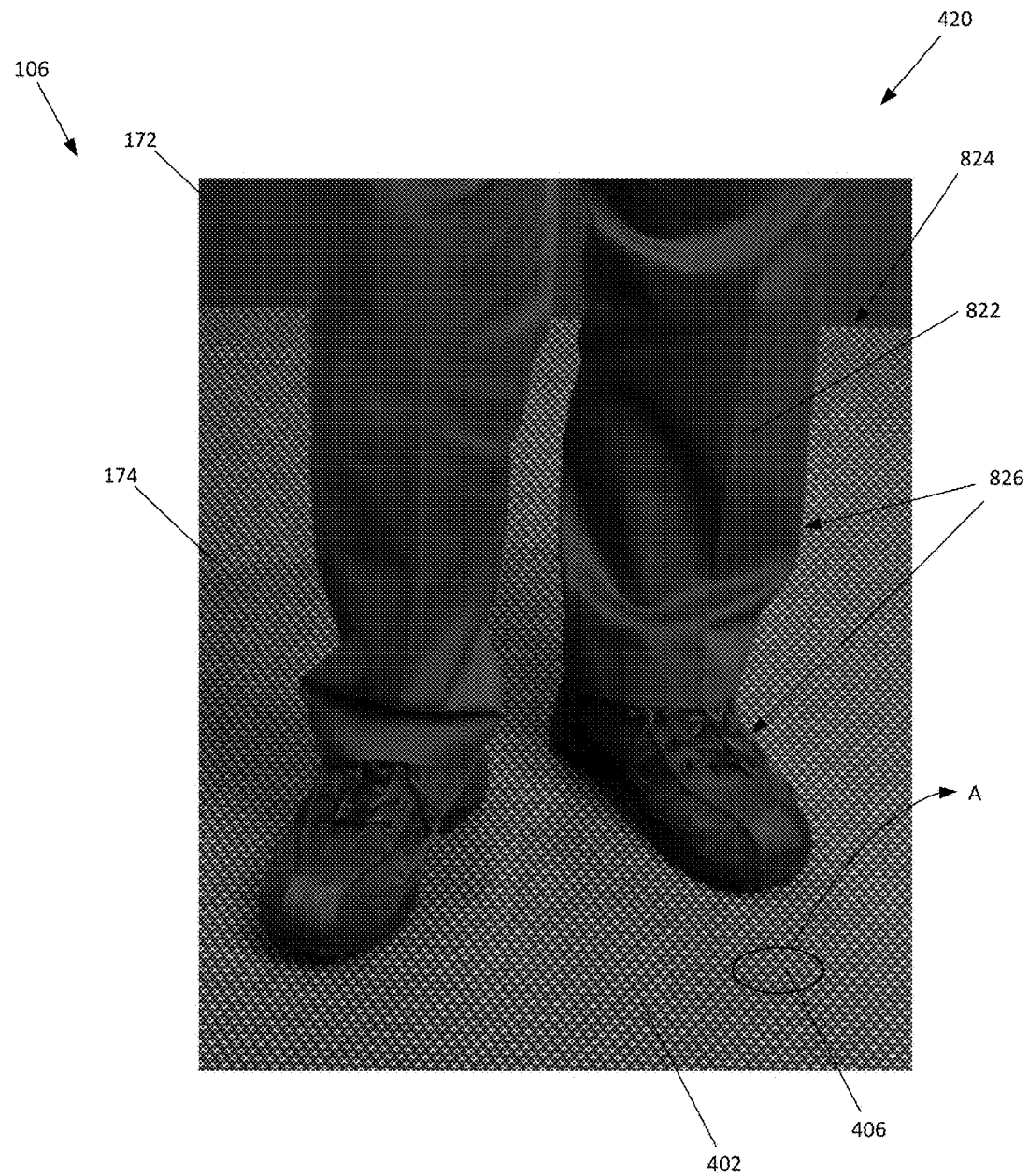
FIG. 15 is a portion of an example original photograph.

FIG. 15 is a portion of an example original photograph 420. The original photograph 420 includes the subject 822 and the photographic scene 106. In the depicted example, the photographic scene 106 includes the background scene 172 and the floor scene 174. The background scene 172 and the floor scene 174 are distinguished and divided at a scene edge 824. As described above, the floor scene 174 includes the patterned surface 402. Further, the original photograph 420 includes boundaries 826 between the subject 822 and the photographic scene 106. The boundaries 826 also form edges in the original photograph 420. The boundaries 826 are also referred to herein as borders or edges.

Figure 16:
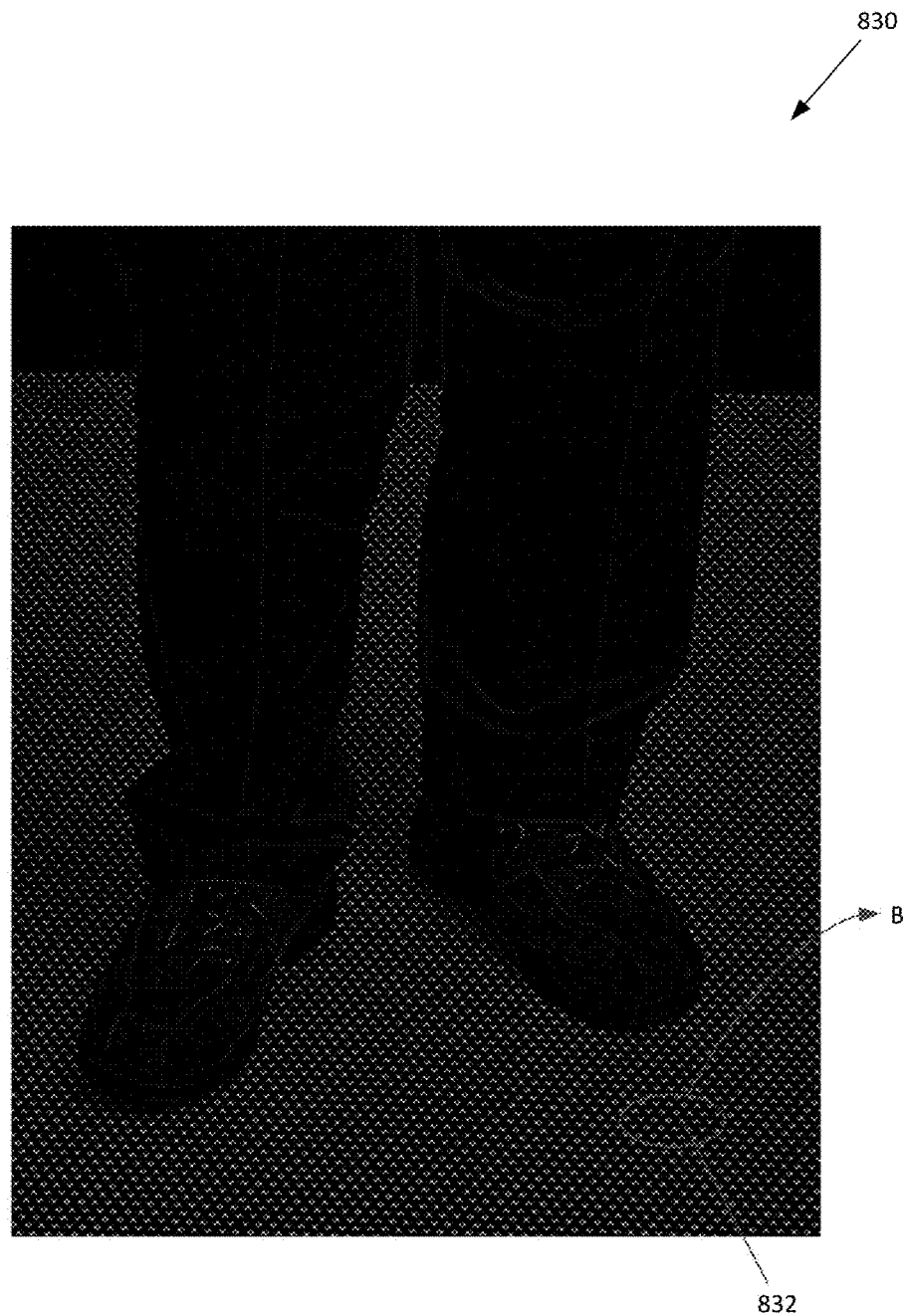
FIG. 16 is a portion of an example subtraction image generated from the original photograph of FIG. 15.

FIG. 16 is a portion of an example subtraction image 830 that is generated from the original photograph 420 of FIG. 15. The subtraction image 830 is an image that amplifies the pattern of detectable features 406 of the original photograph 420.

In some embodiments, the subtraction image 830 includes peaks 832 that are obtained by increasing the signal strength of the pattern of detectable features 406 while reducing the signal strength of other objects in the original photograph 420. In the depicted example, the subtraction image 830 includes the peaks 832 that correspond to the plurality of solid dots 410, 412 and 414 of the patterned surface 402 (FIG. 17), and other objects than the patterned surface 402 of the floor scene 174, such as the subject 822 and the background scene 172, are removed and blackened in the subtraction image 830. An example of the peaks 832 is illustrated and described with reference to FIG. 17.

Figure 17:
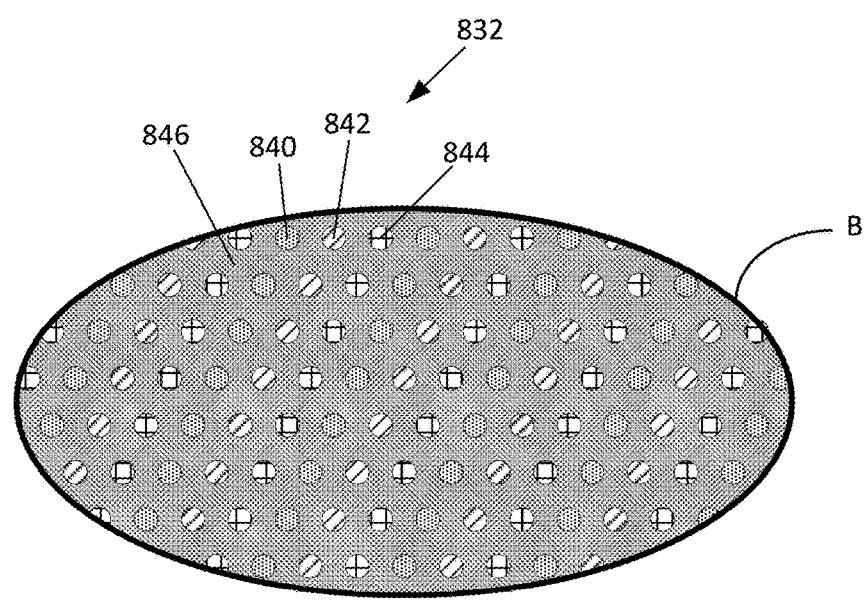
FIG. 17 illustrates example peaks shown in the subtraction image of FIG. 16.

FIG. 17 illustrates example peaks 832 shown in the subtraction image 830 of FIG. 16. In this example, the peaks 832 include a plurality of first peaks 840, a plurality of second peaks 842, and a plurality of third peaks 844.

The primary characteristics of the peaks 832 in the subtraction image 830 includes: (1) The peaks 832 are arranged in the subtraction image 830 in the same locations as the corresponding pattern of detectable features 406 of the original photograph 420; (2) The peaks 832 are spaced apart from one another with a filtered background portion 846, which is, for example, pure black (i.e., the RGB color code is (0,0,0).); and (3) The peaks 832 generally (or at least partially) maintain the original colors of the corresponding pattern of detectable features 406.

As depicted, the peaks 832 maintain the same locations as the plurality of dots of the patterned surface 402. In particular, the plurality of first peaks 840 corresponds to the plurality of first dots 410, the plurality of second peaks 842 corresponds to the plurality of second dots 412, and the plurality of third peaks 844 corresponds to the plurality of third dots 414. The filtered background portion 846 corresponds to the background portion 404 and surrounds the peaks 832 in the same manner that the background portion 404 surrounds the dots 410, 412 and 414. In some embodiments, the filtered background portion 846 is pure black. Further, the first, second and third peaks 840, 842 and 844 maintain the original colors of the first, second and third dots 410, 412 and 414, respectively.

Figure 18:
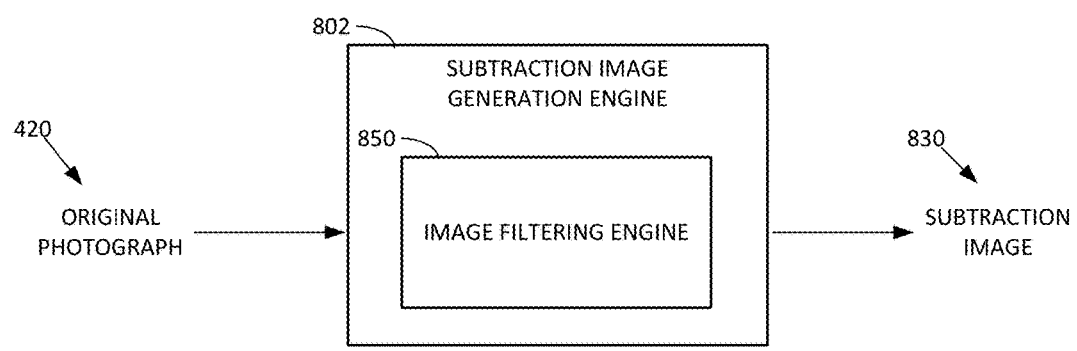
FIG. 18 illustrates an example operation of a subtraction image generation engine.

FIG. 18 illustrates an example operation of the subtraction image generation engine 802 of FIG. 15. In some embodiments, the subtraction image generation engine 802 includes an image filtering engine 850. The image filtering engine 850 uses a set of filters through which the original photograph 420 is convolved to generate the subtraction image 830. In some embodiments, the set of filters includes a plurality of filters, the combination of which is suitable for generating the subtraction image 830. In other embodiments, the set of filters includes a single filter suitable for generating the subtraction image 830. The set of filters is selected to process the original photograph 420 to generate the subtraction image 830 with the characteristics as described above.

In some embodiments, the set of filters are prepared for different dimensions of the pattern of detectable features 406 (e.g., the sizes of the dots 410, 412 and 414 and the relative distances between the dots 410, 412 and 414). In some embodiments, to select an optimal set of filters, the original photograph 420 is analyzed to find the dimension of the pattern of detectable features 406. For example, the subtraction image generation engine 802 operates to sample the patterned surface 402 of the original photograph 420 and measure the sizes of the dots 410, 412 and 414 and the distances between the dots 410, 412 and 414. In some embodiments, the subtraction image generation engine 802 calculates the average values of the measured sizes and distances of the dots 410, 412 and 414 where the dots 410, 412 and 414 vary across the patterned surface 402. Then, the set of filters is selected that can best detect the pattern of detectable features 406 (e.g., the dots 410, 412 and 414) when processed by the pattern detection engine 806 and/or the border detection engine 808.

Figure 19:
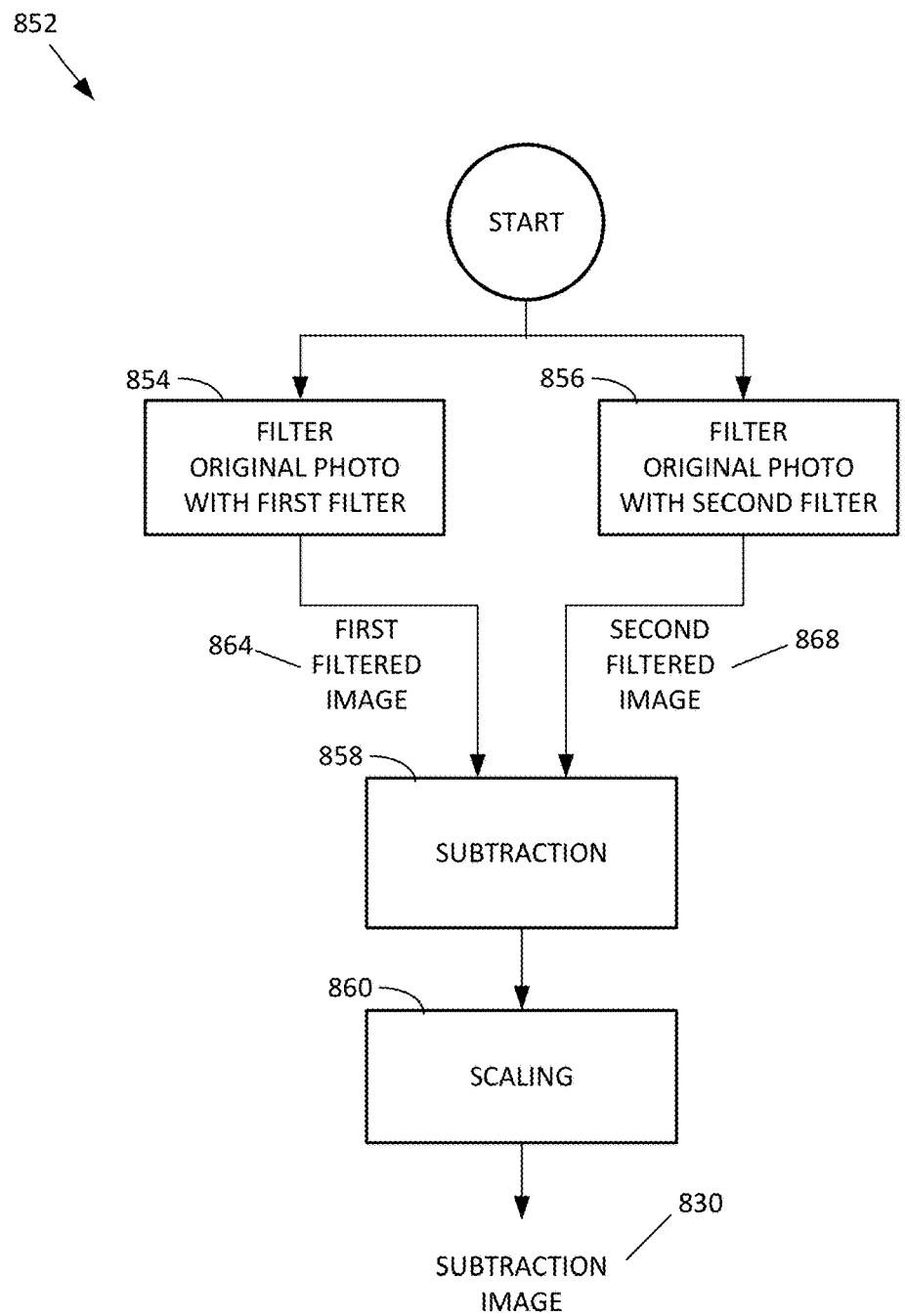
FIG. 19 illustrates an example method of operating an image filtering engine.

FIG. 19 illustrates an example method 852 of operating the image filtering engine 850 of FIG. 18. The method 852 includes operations 854, 856, 858 and 860.

At the operation 854, the original photograph 420 passes through a first filter 862 to generate a first filtered image 864. In some embodiments, the first filter 862 has a characteristic of a low path filter.

At the operation 856, the original photograph 420 passes through a second filter 866 to generate a second filtered image 868. In some embodiments, the second filter 866 has a characteristic of a band-stop filter or band-rejection filter, which is also referred to herein as a funnel filter.

At the operation 858, the first filtered image 864 is subtracted by the second filtered image 868 pixel by pixel.

At the operation 860, the pixels obtained from the operation 858 are scaled by being multiplied by a factor, respectively, to increase the strength of the pixels and optimize the pixels for further processes including pattern detection (by the pattern detection engine 806) and boundary detection (by the border detection engine 808).

In some embodiments, the first and second filters 862 and 866 are generated by calculating the red, green, and blue values of a pixel by weighting the original values of the pixel, as well as weighting the original values of neighboring pixels surrounding the pixel. In some embodiments, the weighting mechanisms for the first and second filters 862 and 866 are based on a distance from a particular pixel, the new value of which is being calculated, to its neighboring pixels. The distance is calculated by the squared difference equation as follows:

$$\text{Distance} = ((x-x_o)^2 + (y-y_o)^2)^{1/2}$$

where x is a horizontal location of a neighboring pixel; y is a vertical location of the neighboring pixel; $x_o$ is a horizontal location of a pixel under calculation; and $y_o$ is vertical location of the pixel under calculation.

The image filtering engine 850 operates to choose predetermined sets of pixels (e.g., 5×5 sets of pixels) with locating a particular pixel that is under calculation at the center of each set. Further, the filters are designed such that if all of the pixels within the matrix have the same value, the resulting value of the calculated pixel will remain unchanged. In other words, the filters are designed such that the filter weighting values of all pixels within each set of pixels is 1.0 when added up. For example, the twenty-five weighting values within each 5×5 set of pixels will sum to 1.0.

The following is an example algorithm for weighting value calculation for the first filter 862 used by the subtraction image generation engine 802 such as illustrated in FIG. 19. As shown in Algorithm 1, the weighting value calculation is based on a Gaussian distribution.

---

ALGORITHM 1

```
void calculateGaussianFilter( int gaussianFilterSize,
double gaussianDeviation, double *gaussianFilter )
{
    int h, hoff, w;
    int gaussianFilterOffset;
    double distanceSquared, deviation;
    double deviationTotal;
    //  Generating gaussian filter array
    gaussianFilterOffset = gaussianFilterSize / 2;
    deviationTotal = 0.0;
    for( h = 0; h < gaussianFilterSize; h++ )
    {
        hoff = h * gaussianFilterSize;
        for( w = 0; w < gaussianFilterSize; w++ )
        {
            distanceSquared = pow( (double) h - (double) gaussianFilterOffset , 2.0 ) +
  pow( (double) w - (double) gaussianFilterOffset, 2.0 );
            deviation = exp( -distanceSquared / (2.0 * gaussianDeviation * gaussianDeviation));
            *(gaussianFilter + hoff + w) = deviation;
            deviationTotal += deviation;
```

```
ALGORITHM 1

}
    }
    for( h = 0; h < gaussianFilterSize; h++ )
    {
        hoff = h * gaussianFilterSize;
        for( w = 0; w < gaussianFilterSize; w++ )
            *(gaussianFilter + hoff + w) =
*(gaussianFilter + hoff + w) / deviationTotal;
    }
    return;
}
```

Where:
gaussianFilterSize: is the size of the matrix or kernel used in the filter. Based on the diagram above this would be set to five. Note however that as these filters adapt to the size of the peaks the kernel sizes will change accordingly.
gaussianDeviation: The deviation of the filter. This value will also adapt to the size of the peaks.

The following is an example algorithm for weighting value calculation for the second filter 866 used by the subtraction image generation engine 802 such as illustrated in FIG. 19. As shown in Algorithm 2, the weighting value calculation is based on a distribution that resembles a funnel.

```
ALGORITHM 2 void calculateGaussianFunnelFilter( int gaussianFilterSize,
    double gaussianDeviation1, double gaussianDeviation2,
    double *gaussianFilter )
{
    int h, hoff, w;
    int gaussianFilterOffset;
    double distanceSquared, deviation1, deviation2;
    double deviationTotal;
    //  Generating gaussian filter array
    gaussianFilterOffset = gaussianFilterSize / 2;
    deviationTotal = 0.0;
    for( h = 0; h < gaussianFilterSize; h++ )
    {
        hoff = h * gaussianFilterSize;
        for( w = 0; w < gaussianFilterSize; w++ )
        {
            distanceSquared = pow( (double) h - (double)
gaussianFilterOffset , 2.0 ) +
pow( (double) w - (double) gaussianFilterOffset, 2.0 );
            deviation1 = exp( -distanceSquared / (2 *
gaussianDeviation1 * gaussianDeviation1));
            deviation2 = exp( -distanceSquared / (2 *
gaussianDeviation2 * gaussianDeviation2));
            *(gaussianFilter + hoff + w) = deviation1 -
deviation2;
            deviationTotal += (deviation1 - deviation2);
        }
    }
    for( h = 0; h < gaussianFilterSize; h++ )
    {
        hoff = h * gaussianFilterSize;
        for( w = 0; w < gaussianFilterSize; w++ )
            *(gaussianFilter + hoff + w) =
*(gaussianFilter + hoff + w) / deviationTotal;
    }
    return;
}
```

Where:
gaussianFilterSize: is the size of the matrix or kernel used in the filter. Based on the diagram above this would be set to five. Note however that as these filters adapt to the size of the peaks the kernel sizes will change accordingly.
gaussianDeviation1 and gaussianDeviation2: The deviation values of the filter. These values will also adapt to the size of the peaks. Also the value of gaussianDeviaton2 will be larger than gaussianDeviation1.

Algorithm 3 is an example algorithm for the subtraction operation 858 and the scaling operation 860 as illustrated in FIG. 19.

```
ALGORITHM 3 void SubtractOneImageFromAnotherColor( unsigned char
*Filter1Array, unsigned char* Filter2Array, unsigned char*
finalArray, int originalHeight, int originalWidth )
{
    int j;
    int valueRed, valueGreen, valueBlue;
    int gain = 2;
    for( j = 0; j < originalHeight * originalWidth * 3; j
+= 3 )
    {
        valueRed = *(originalArray + j) -
*(subtractionArray + j);
        valueRed *= gain;
        if( valueRed < 0 )valueRed = 0;
        if( valueRed > 255 )valueRed = 255;
        *(finalArray + j) = valueRed;
        valueGreen = *(originalArray + j + 1) -
*(subtractionArray + j + 1);
        valueGreen *= gain;
        if( valueGreen < 0 )valueGreen = 0;
        if( valueGreen > 255 )valueGreen = 255;
        *(finalArray + j + 1) = valueGreen;
        valueBlue = *(originalArray + j + 2) -
*(subtractionArray + j + 2);
        valueBlue *= gain;
        if( valueBlue < 0 )valueBlue = 0;
        if( valueBlue > 255 )valueBlue = 255;
        *(finalArray + j + 2) = valueBlue;
    }
    return;
}
```

Although specific algorithms are provided as above, these details are provided by way of example only. Other embodiments include other algorithms other than the ones described above.

Figure 20:
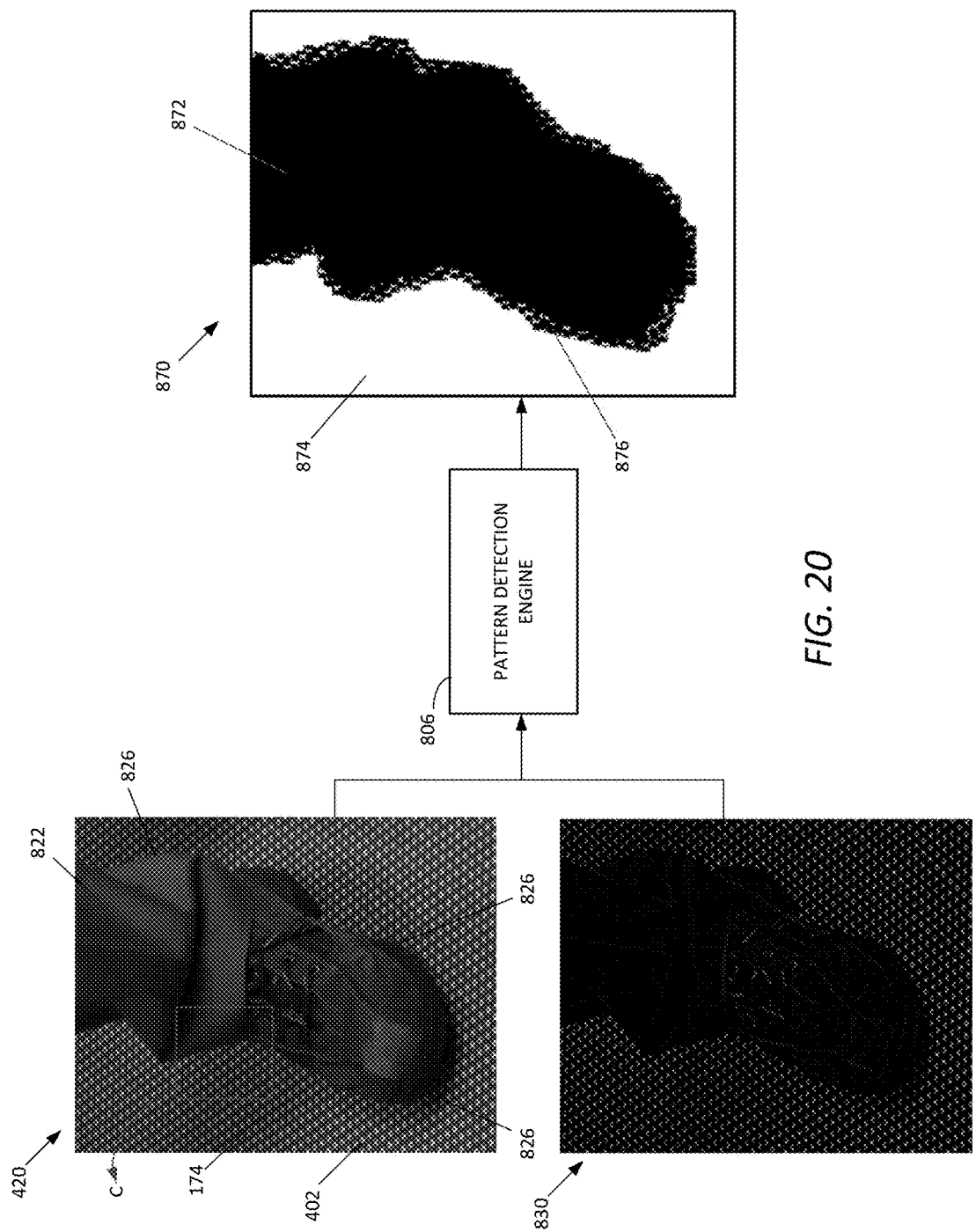
FIG. 20 is a schematic diagram illustrating an example pattern detection engine.

FIG. 20 is a schematic diagram illustrating an example pattern detection engine 806. The pattern detection engine 806 operates to receive either the data of the original photograph 420 or the subtraction image 830, or both, and process to detect the patterned surface 402 of the floor scene 174. Then, the pattern detection engine 806 operates to generate a first intermediate mask 870 that can remove the detected patterned surface 402 from the original photograph 420.

In some embodiments, the pattern detection engine 806 uses either the original photograph 420 or the subtraction image 830. In other embodiments, both the original photograph 420 and the subtraction image 830 are used in at least some of the operations performed by the pattern detection engine 806.

The first intermediate mask 870 is configured to pass through the subject 822 and remove a pure portion (i.e., a pure patterned region 944 (FIG. 26)) of the floor scene 174 that is clearly identified as the patterned surface 402. The first intermediate mask 870 includes a filtered subject region 872, a filtered pure patterned region 874, and an undetermined region 876.

The filtered subject region 872 corresponds to the subject 822 of the original photograph 420 and would leave the subject 822 if the original photograph 420 passes through the first intermediate mask 870.

The filtered pure patterned region 874 corresponds to the pure portion (i.e., the pure patterned region 944 (FIG. 26))

of the patterned surface 402 in the floor scene 174 and is configured to remove the pure portion of the patterned surface 402 if the original photograph 420 passes through the first intermediate mask 870.

The undetermined region 876 is a region that is not identified by the pattern detection engine 806 as either the filtered subject region 872 or the filtered pure patterned region 874. In some embodiments, the subject 822 covers at least partially the dots 410, 412 and 414 (i.e., the peaks 832 in the subtraction image 830) at or around the boundaries 826. Therefore, the dots 410, 412 and 414 (i.e., the peaks 832 in the subtraction image 830) do not meet the algorithm of the pattern detection engine 806 as described in FIG. 21, and, thus, are not identified at or around the boundaries 826 (also referred to herein as borders or edges) by the pattern detection engine 806. Accordingly, such unidentified dots 410, 412 and 414 at or around the boundaries 826 are represented as the undetermined region 876 along the edges 826 of the subject 822 in the first intermediate mask 870. The undetermined region 876 is processed by the border detection engine 808, as illustrated with reference to FIG. 25.

Figure 21:
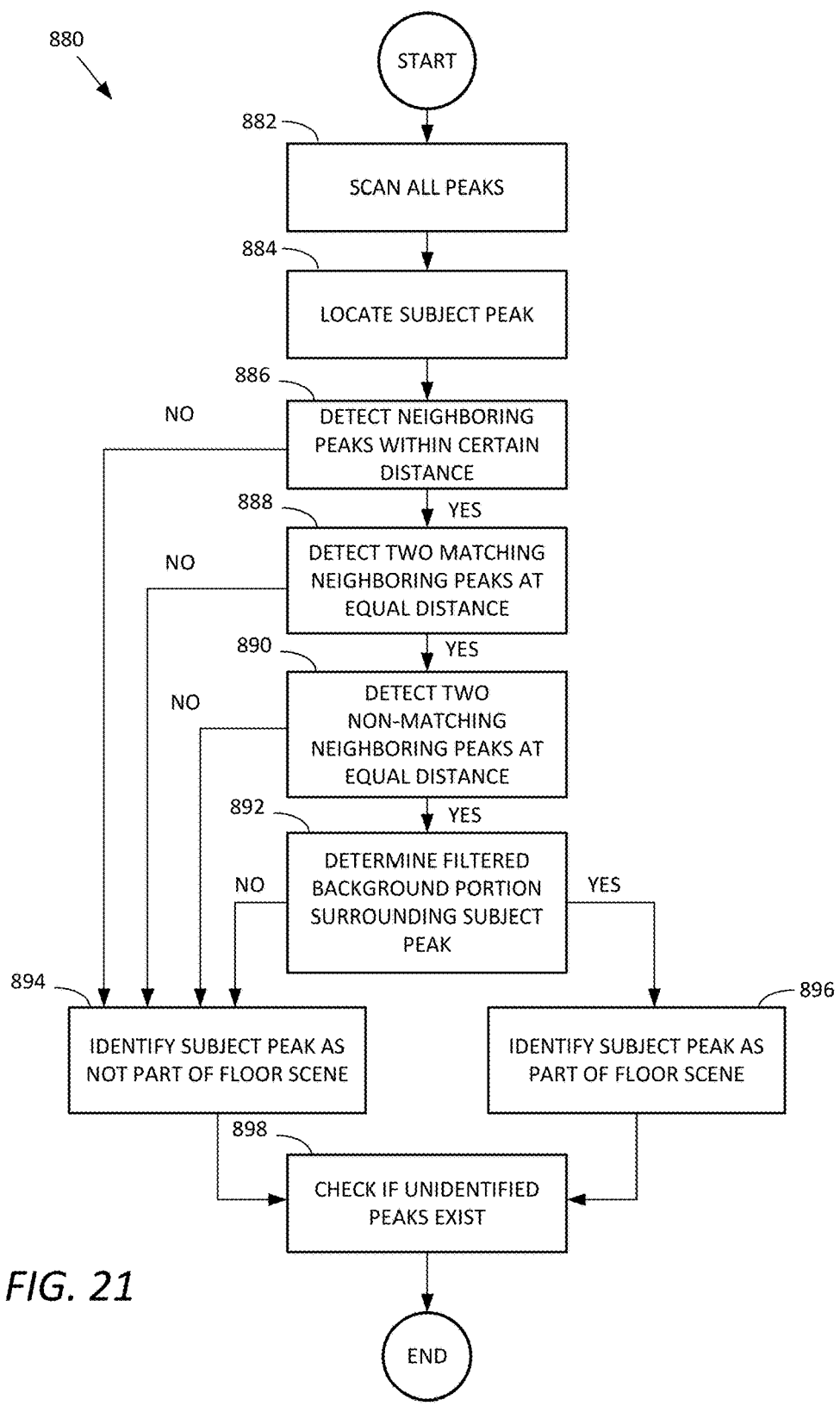
FIG. 21 is a flowchart illustrating an example method of operating the pattern detection engine of FIG. 20.

FIG. 21 is a flowchart illustrating an example method 880 of operating the pattern detection engine 806. The method 880 includes operations 882, 884, 886, 888, 890, 892, 894, 896 and 898.

As described above, the pattern detection engine 806 operates to detect the patterned surface 402 of the photographic scene 106. In this example, therefore, the pattern detection engine 806 is performed to detect the floor scene 174 having the patterned surface 402 and separate the floor scene 174 from the subject 822 and the background scene 172 that does not include the patterned surface 402.

The pattern detection engine 806 performs at least some of the operations 882, 884, 886, 888, 890, 892, 894, 896 and 898 with either the original photograph 420 or the subtraction image 830. In other embodiments, the pattern detection engine 806 can use both the original photograph 420 and the subtraction image 830 for at least some of the operations 882, 884, 886, 888, 890, 892, 894, 896 and 898. In some embodiments, the first filtered image 864 is used in replace with the original photograph 420. The operations 882, 884, 886, 888, 890, 892, 894, 896 and 898 are herein illustrated and described primarily with the subtraction image 830. However, it is apparent that the pattern detection engine 806 can alternatively or additionally use the original photograph 420 to perform the operations 882, 884, 886, 888, 890, 892, 894, 896 and 898 in the same or similar manner.

At the operation 882, the pattern detection engine 806 operates to scan the subtraction image 830 to detect the peaks 832 therein. Once all of the peaks 832 are identified, the method 880 proceeds to the operation 884. In other embodiments, instead of the subtraction image 830, the first filtered image 864 is used to detect the peaks 832. The first filtered image 864 can provide a better result in finding the peaks 832 because of its low pass filtered nature of the image.

At the operation 884, the pattern detection engine 806 operates to locate a subject peak 900 (FIG. 22), which will be analyzed to determine whether the subject peak 900 is part of the floor scene 174. As described below, the pattern detection engine 806 performs the method 880 for all of the peaks 832 that have been detected at the operation 882. Thus, in some embodiments, the subject peak 900 is randomly selected among the detected peaks 832. In other embodiments, the subject peak 900 is selected in a predetermined order or algorithm.

At the operation 886, the pattern detection engine 806 operates to detect neighboring peaks 902 (FIG. 22) around the subject peak 900 within a predetermined distance from the subject peak 900 (e.g., within a predetermined number of pixels around the subject peak 900). In some embodiments, the pattern detection engine 806 detects the neighboring peaks 902 circumferentially around the subject peak 900 within a predetermined radius (D6) from the subject peak 900. In some embodiments, the predetermined distance or radius (D6) is determined to limit a period of running time during which the pattern detection engine 806 is executed. In other embodiment, the predetermined distance or radius is determined to be not less than the smallest of the distances D1, D2 and D3 between the peaks 832 so that at least one peak is found around the subject peak 900 in the same radial direction from the subject peak 900.

In some embodiments, the pattern detection engine 806 is configured to detect a predetermined number of neighboring peaks 902 within a predetermined distance around the subject peak 900. In the depicted example, the operation 886 is performed to detect at least four neighboring peaks 902 around the subject peak 900. In some embodiments, the pattern detection engine 806 is configured to stop detecting more than a predetermined number of neighboring peaks. In the depicted example, the operation 886 is performed to detect up to six peaks around the subject peak 900. In other embodiments, the pattern detection engine 806 operates to identify at least four neighboring peaks 902 and as many as six neighboring peaks 902 within the predetermined distance D6 around the subject peak 900.

In some embodiments, if the pattern detection engine 806 fails to detect the predetermined number of neighboring peaks within the predetermined distance ("NO" at the operation 886), the pattern detection engine 806 determines that the subject peak 900 is not part of the floor scene 174.

In other embodiments, the pattern detection engine 806 is configured to perform the operation 886 until it detects a predetermined number of neighboring peaks 902, either within a predetermined distance from the subject peak 900, or regardless of the distance from the subject peak 900.

At the operation 888, the pattern detection engine 806 operates to detect two matching neighboring peaks 904 (FIG. 23) located at substantially equal distances, but in opposite directions, from the subject peak 900. The matching neighboring peaks 904 are defined as neighboring peaks with substantially the same color as the subject peak 900. If the pattern detection engine 806 fails to find the two matching neighboring peaks 904 ("NO" at the operation 888), the pattern detection engine 806 determines that the subject peak 900 is not part of the floor scene 174. If the two matching neighboring peaks 904 are found ("YES" at the operation 888), the method 880 proceeds to the operation 890.

At the operation 890, the pattern detection engine 806 operates to detect two non-matching neighboring peaks 910 and 912 (FIG. 24) located at substantially equal distances, but in opposite directions, from the subject peak 900. The non-matching neighboring peaks 910 and 912 are defined as neighboring peaks with colors substantially different from the subject peak 900. If the pattern detection engine 806 fails to find the two non-matching neighboring peaks 910 and 912 ("NO" at the operation 890), the pattern detection engine 806 determines that the subject peak 900 is not part of the floor scene 174. If the two non-matching neighboring peaks 910 and 912 are found ("YES" at the operation 890), the method 880 proceeds to the operation 892.

The operations 888 and 890 are performed after the operation 886 because the peaks detected in the operation 886 may not be the neighboring peaks 902, which intend to be identified by the pattern detection engine 806. This may occur because of several factors, such as the angle and/or distance of the camera.

At the operation 892, the pattern detection engine 806 operates to determine whether the subject peak 900 is completely surrounded by the filtered background portion 846 of the subtraction image 830. If the pattern detection engine 806 determines that the subject peak 900 is not completely surrounded by the filtered background portion 846 (e.g., where the subject peak 900 contacts other colored portions or other peaks) ("NO" at the operation 892), the method 880 proceeds to the operation 894. If it is detected that the subject peak 900 is completely surrounded by the filtered background portion 846 ("YES" at the operation 892), the method 880 proceeds to the operation 896.

At the operation 894, the pattern detection engine 806 categorizes the subject peak 900 as not part of the floor scene 174.

At the operation 896, the subject peak 900 is regarded as part of the floor scene 174, which corresponds to the pure patterned region 944 (FIG. 26)) of the patterned surface 402 or the filtered pure patterned region 874 of the first intermediate mask 870.

At the operation 898, the pattern detection engine 806 determines if there are peaks 832 that remain unidentified as to whether they are part of the floor scene 174. If the pattern detection engine 806 identifies peaks that have not been examined at the operations 886, 888, 890, 892, 894, and 896, as illustrated above, the method 880 proceeds to the operation 884 and repeats the remaining operations as described above. If there is found no peak that has not been examined, the method 880 ends and the pattern detection engine 806 generates the first intermediate mask 870.

Figure 22:
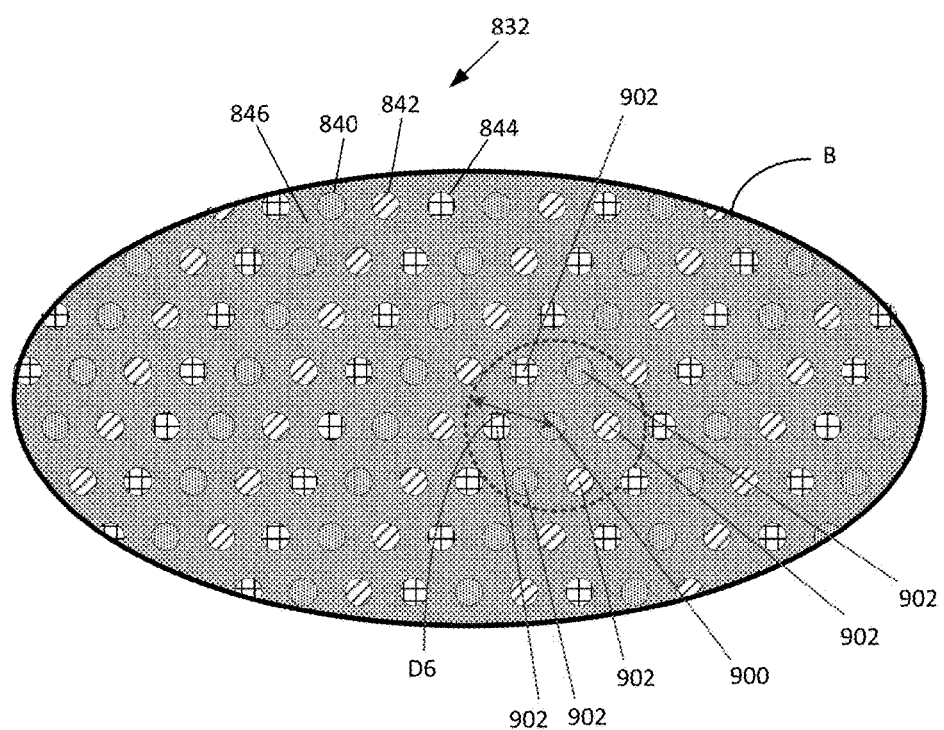
FIG. 22 is a schematic diagram illustrating an example operation for detecting neighboring peaks around a subject peak.

FIG. 22 is a schematic diagram illustrating an example operation 886 for detecting neighboring peaks 902 around the subject peak 900. As depicted, the pattern detection engine 806 has detected six neighboring peaks 902 around the subject peak 900. In this example, the six neighboring peaks 902 are located within the radius D6 from the subject peak 900.

Figure 23:
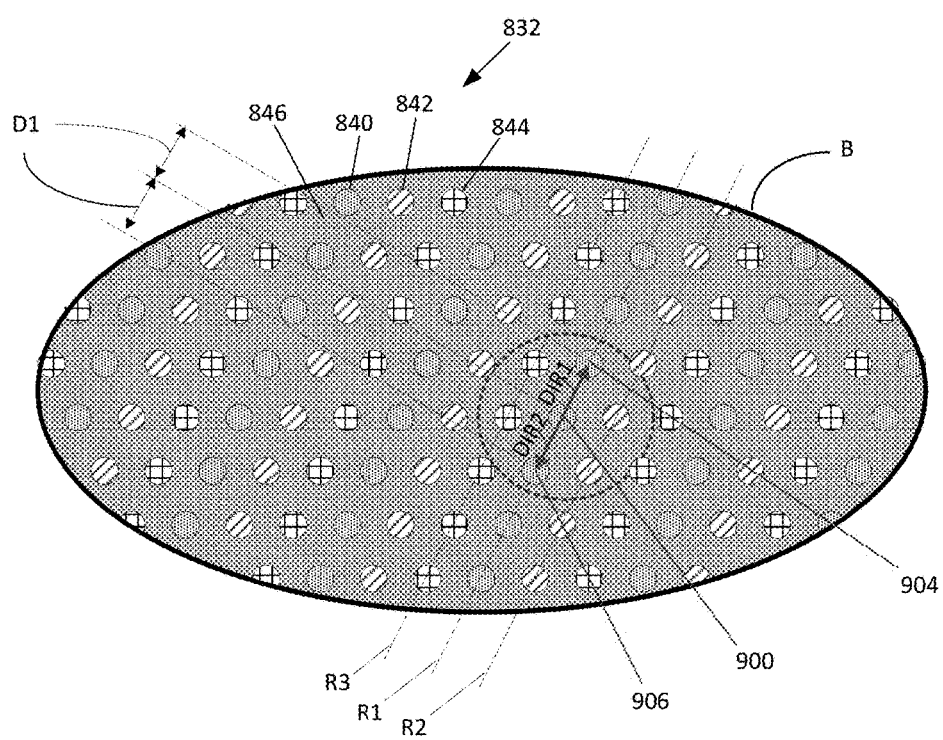
FIG. 23 is a schematic diagram illustrating an example operation for detecting two matching neighboring peaks around the subject peak.

FIG. 23 is a schematic diagram illustrating an example operation 888 for detecting two matching neighboring peaks 904 around the subject peak 900. As depicted, the pattern detection engine 806 has detected two matching neighboring peaks 904 (i.e., two peaks with the same color as the subject peak), each of which spaced apart from the subject peak 900 at the substantially equal distances D1 and arranged in the opposite directions DIR1 and DIR2.

Figure 24:
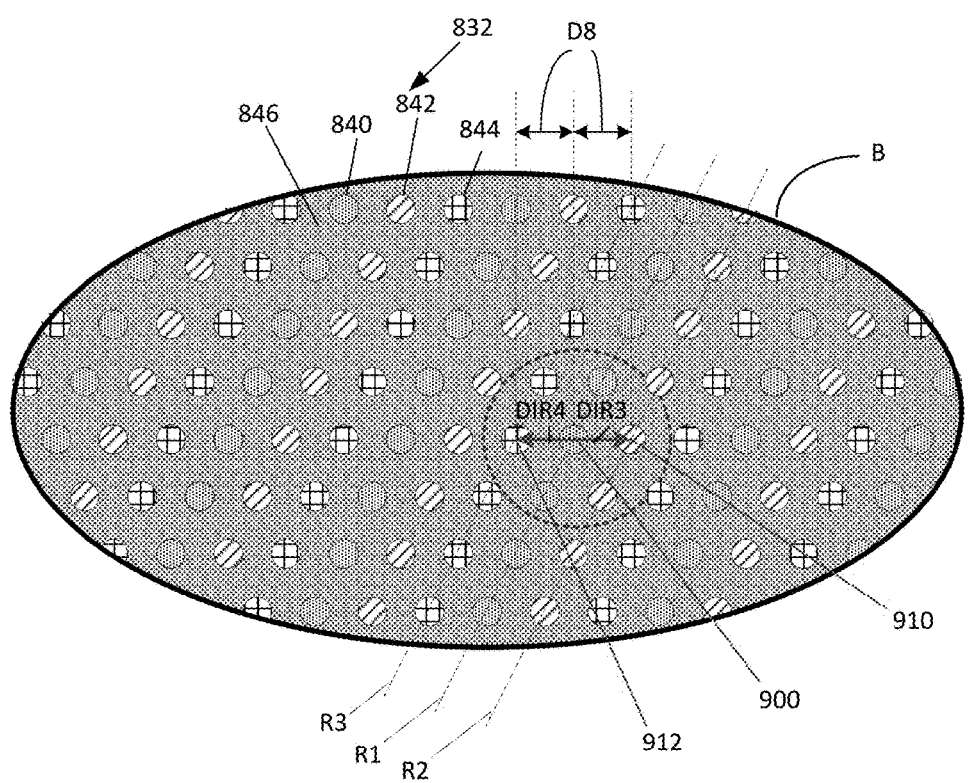
FIG. 24 is a schematic diagram illustrating an example operation for detecting two non-matching neighboring peaks around the subject peak.

FIG. 24 is a schematic diagram illustrating an example operation 890 for detecting two non-matching neighboring peaks 910 and 912 around the subject peak 900. As depicted, the pattern detection engine 806 has detected two non-matching neighboring peaks 910 and 912 (i.e., two peaks with different colors from the subject peak), each of which spaced apart from the subject peak 900 at the substantially equal distances D8 and arranged in the opposite directions DIR3 and DIR4. In some embodiments, the pattern detection engine 806 is designed to search for non-matching neighboring peaks counter-clockwise from the detected matching neighboring peaks 904 around the subject peak 900. In other embodiments, such non-matching neighboring peaks are detected clockwise from the detected matching neighboring peaks 904 around the subject peak 900. In either case, the pattern detection engine 806 operates to perform the detection of non-matching neighboring peaks in the same direction (either clockwise or counter-clockwise) around the subject peak 900 as it evaluates all of the subject peaks 900.

Figure 25:
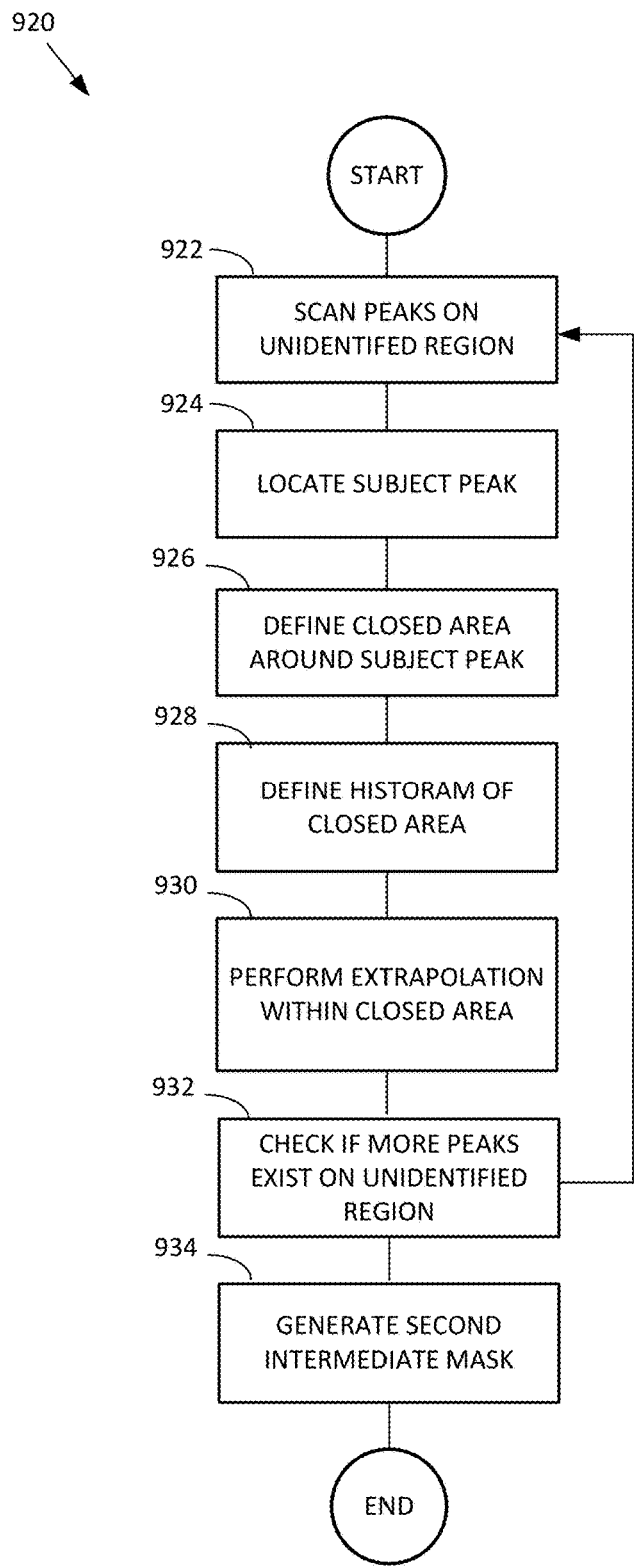
FIG. 25 is a flowchart illustrating a method for performing a border detection engine.

FIG. 25 is a flowchart illustrating a method 920 for performing the border detection engine 808 of FIG. 14. The method 880 includes operations 922, 924, 926, 928, 930, 932 and 934.

The border detection engine 808 operates to detect the pattern of detectable features 406 (e.g., the dots 410, 412 and 414) at or around the boundaries 826 between the subject 822 and the patterned surface 402 of the floor scene 174. As described above, in some embodiments, the subject 822 covers the dots 410, 412 and 414 (i.e., the peaks 832 in the subtraction image 830) at least partially at or around the boundaries 826. Therefore, the dots 410, 412 and 414 (i.e., the peaks 832 in the subtraction image 830) do not meet the algorithm of the pattern detection engine 806 as described in FIG. 21, and thus are not identified at or around the boundaries 826 (also referred to herein as borders or edges) by the pattern detection engine 806 as illustrated above. Accordingly, as described below, the border detection engine 808 performs to detect the dots 410, 412 and 414 (i.e., the peaks 832) at or around the boundaries 826 and delineate the subject 822 and the floor scene 174 at the boundaries 826.

The border detection engine 808 performs at least some of the operations 922, 924, 926, 928, 930, 932 and 934 with one of the original photograph 420, the subtraction image 830 and the first intermediate mask 870. In other embodiments, the pattern detection engine 806 can use any combination of the original photograph 420, the subtraction image 830 and the first intermediate mask 870 for at least some of the operations 922, 924, 926, 928, 930, 932 and 934. The operations 922, 924, 926, 928, 930, 932 and 934 are herein illustrated and described primarily with respect to the original photograph 420 and/or the subtraction image 830. However, it is apparent that the first intermediate mask 870 is additionally or alternatively used to perform the operations 922, 924, 926, 928, 930, 932 and 934 in the same or similar manner.

At the operation 922, the border detection engine 808 operates to scan the peaks 832 at or around the boundaries 826 between the subject 822 and the floor scene 174. In some embodiments, the border detection engine 808 operates to search the peaks 832 on or around an edge region 946 (FIG. 26), which corresponds to the unidentified region 876 of the first intermediate mask 870.

At the operation 924, the border detection engine 808 operates to locate a subject peak 950 (FIG. 26), which provides a reference point for the subsequent operations. As described below, the border detection engine 808 performs the method 920 for all of the peaks 832 that has been detected at the operation 922. Thus, in some embodiments, the subject peak 950 is randomly selected among the detected peaks 832. In other embodiments, the subject peak 950 is selected in a predetermined order or algorithm.

At the operation 926, the border detection engine 808 operates to define a closed area 952 (FIG. 26) around the subject peak 950. The closed area 952 is selected to incorporate a subject region 942, a pure patterned region 944, and the edge region 946, which, respectively, correspond to the filtered subject region 872, the filtered pure patterned region 874, and the unidentified region 876 of the first intermediate mask 870.

At the operation 928, the border detection engine 808 operates to define an image histogram of the closed area 952 of the original photograph 420. The image histogram contains a graphical representation of the tonal distribution within the closed area 952. In some embodiments, the image histogram is created with respect to the pure patterned region 944, which corresponds to the filtered pure patterned region 874. In this case, the image histogram is built based on the colors of the background portion 404 and the pattern of detectable features 406 (e.g., the dots 410, 412, 414), and the color variations thereof.

In other embodiments, the image histogram is built based not on the colors of the pattern of detectable features 406 (e.g., the dots 410, 412 and 414), but on the tonal distribution of the background portion 404. Compared to the colors of the pattern of detectable features 406, the background portion 404 has a limited color range centered on a darker color than the colors of the pattern of detectable features 406. As described above, the color C4 of the background portion 404 is typically selected not to be shared with the colors of the clothing or shoes of the subject 822. In contrast, in many cases, the colors of the pattern of detectable features 406 (e.g., the dots 410, 412 and 414) may also be part of the colors of the subject 822, and, thus, an image histogram that is defined with the colors of the pattern of detectable features 406 may make it difficult for the border detection engine 808 to perform the differentiation analysis between the subject region 942 and the pure patterned region 944. Therefore, in some embodiments, the image histogram based only on the background portion 404 ensures the better performance of the border detection engine 808 in later operations, such as the operation 930.

To select the background portion 404 with increased accuracy in defining the image histogram, the border detection engine 808 can consider the subtraction image 830 and select only pixels that correspond to the filtered background portion 846, which is, for example, pure black (i.e., the RGB color code is (0,0,0).). For example, the border detection engine 808 operates to select the background portion 404 to define the image histogram by considering the pixels of the subtraction image 830 that are centered in its clusters of pixels with the pure black (i.e., pixels with (0,0,0) values).

Algorithm 4 is an example algorithm for the image histogram as illustrated above. The following structure contains the vertical and horizontal locations of the matching and non-matching peaks selected for each scene peak.

ALGORITHM 4

```
typedef struct {
        int match1Vertical;
        int match1Horizontal;
        int match2Vertical;
        int match2Horizontal;
        int noMatch1Vertical;
        int noMatch1Horizontal;
        int noMatch2Vertical;
        int noMatch2Horizontal;
        int locationVertical;
        int red;
        int green;
        int blue;
        int type;
} PeakInfo;
PeakInfo *peaks;
int updateFillFromBoundaryHistogramAnalysis1AdaptiveSubtract( unsigned char*
originalArray,
            unsigned char *subtractArray, unsigned char *fillArray, int
originalHeight,
            int originalWidth, double slope, double intercept, int histogramDepth )
{
    int j, joff, joff3, i, ioff3, h, hoff, hoff3, w, woff, woff3, k;
    int *peakHistogram;
    int histogramSize, histogramSizeOffset;
    int redIndex, greenIndex, blueIndex;
    int histogramAnalysis;
    unsigned char *fillHistogram;
    double distanceFactor;
    unsigned char *activeHistogramPixels;
    if(!(peakHistogram = new int [histogramDepth * histogramDepth *
histogramDepth]))
        return(FALSE);
    if(!(activeHistogramPixels = new unsigned char [original Width * originalHeight]))
        return(FALSE);
    if(!(fillHistogram = new unsigned char [originalWidth * originalHeight]))
        return(FALSE);
    // Initialize the histogram array
    for( j = 0; j < originalWidth * originalHeight; j++ )
        *(fillHistogram + j) = 0;
    // Fill array that contains pixels to sample based on subtract array
    for( j = 0; j < originalWidth * originalHeight; j++ )
    {
        joff3 = 3 * j;
        if( *(subtractArray+joff3) == 0 && *(subtractArray+joff3+1) == 0 &&
*(subtractArray+joff3+2) == 0 )
            *(activeHistogramPixels + j) = 255;
        else
            *(activeHistogramPixels + j) = 0;
    }
    for( j = 20; j < originalHeight - 20; j++ )
    {
```

ALGORITHM 4-continued

```
            joff = j * originalWidth;
            joff3 = 3 * joff;
            distanceFactor = slope * (double) j + intercept ;
            histogramSize = (int) (3.0 * distanceFactor);
            histogramSize /= 2;
            histogramSize *= 2;
            histogramSize += 1;
            histogramSizeOffset = histogramSize / 2;
            for( i = 20; i < original Width - 20; i++ )
            {
                ioff3 = 3 * i;
                // checking to see if the peak is a boundary peak. If it is a histogram will be made of it and
                     neighboring peaks
                if( peaks[joff + i].type == 1 )
                {
                    if( peaks[peaks[joff + i].match1Vertical * originalWidth +
                                              peaks[joff + i].match1Horizontal].type != 1 ||
                         peaks [peaks[joff + i].match2Vertical * originalWidth +
                                              peaks[joff + i].match2Horizontal].type != 1 ||
                         peaks[peaks[joff + i].noMatch1Vertical * originalWidth +
                                              peaks[joff + i].noMatch1Horizontal].type != 1 ||
                         peaks[peaks[joff + i].noMatch2Vertical * originalWidth +
                                              peaks[joff + i].noMatch2Horizontal].type != 1 )
                    {
                        histogramAnalysis = FALSE;
                        // Build histogram using pixels within the square that have been defined as pattern
                             pixels through the fill Array
                        for( k = 0; k < histogramDepth * histogramDepth * histogramDepth; k++ )
                             *(peakHistogram + k) = FALSE;
                        // Adding boundary peak to histogram
                        for( h = 0; h < histogramSize; h++ )
                        {
                             hoff = (j + h - histogramSizeOffset) * originalWidth;
                             hoff3 = 3 * hoff;
                             for( w = 0; w < histogramSize; w++ )
                             {
                                 woff = i + w - histogramSizeOffset;
                                 woff3 = 3 * woff;
                                 if( *(fillArray + hoff + woff) == 255 &&
                                                   *(activeHistogramPixels + hoff + woff) == 255 )
                                 {
                                     redIndex = histogramDepth * *(originalArray + hoff3 + woff3) / 255;
                                     greenIndex = histogramDepth * *(originalArray + hoff3 + woff3 + 1) / 255;
                                     blueIndex = histogramDepth * *(originalArray + hoff3 + woff3 + 2) / 255;
                                     *(peakHistogram + redIndex * histogramDepth * histogramDepth +
                                                   greenIndex * histogramDepth + blueIndex ) = TRUE;
                                 }
                             }
                        }
                        for( h = 0; h < histogramSize; h++ )
                        {
                             hoff = (j + h - histogramSizeOffset) * originalWidth;
                             hoff3 = 3 * hoff;
                             for( w = 0; w < histogramSize; w++ )
                             {
                                 woff = i + w - histogramSizeOffset;
                                 woff3 = 3 * woff;
                                 if( *(fillArray + hoff + woff) == 0 &&
                                                   *(activeHistogramPixels + hoff + woff) == 255 )
                                 {
                                     redIndex = histogramDepth * *(originalArray + hoff3 + woff3) / 255;
                                     greenIndex = histogramDepth * *(originalArray + hoff3 + woff3 + 1) / 255;
                                     blueIndex = histogramDepth * *(originalArray + hoff3 + woff3 + 2) / 255;
```

ALGORITHM 4-continued

```
                    if( *(peakHistogram + redIndex * histogramDepth *
histogramDepth +
                                        greenIndex * histogramDepth +
blueIndex ) == TRUE )
                        *(fillHistogram + hoff + woff) = 255;
                    }
                }
            }
        }
    }
}
for( j = 0; j < originalWidth * originalHeight; j++ )
{
    if( *(fillHistogram + j) == 255 )
        *(fillArray + j) = 255;
}
if (fillHistogram != NULL)
    delete[ ] fillHistogram;
if (peakHistogram != NULL)
    delete[ ] peakHistogram;
return(TRUE);
}
```

Definition of Function Arguments originalArray: a one dimensional Array holding the original image
subtractArray: a one dimensional Array holding the subtraction image
fillArray: the mask array that is modified with the results of the histogram analysis
originalHeight: the height in pixels of the original Image
originalWidth: the width in pixels of the original Image
slope & intercept: These are used to spatially scale the histogram algorithm based on prior knowledge of how large the scene pattern is. For instance size and distance between peaks.
histogramDepth: the number of levels that the histogram has across the range of color values (in 3 dimensions)

At the operation 930, the border detection engine 808 operates to perform extrapolation within the closed area 952 by using the image histogram defined above. In particular, the border detection engine 808 refers to the tonal distribution of the image histogram created at the operation 928 and determines if the pixels contained within the closed area (e.g., the pixels in the edge region 946 of the closed area 952) belong to the subject region 942 or the pure patterned region 944.

In some embodiments, when a certain area of the pixels are identified as belonging to the pure patterned region 944, the area of the pixels are expanded to fill the edge region 946 between the subject region 942 and the pure patterned region 944.

In some embodiments, the border detection engine 808 operates to expand the area of the pixels into the subject region 942 to override actual edges of the subject 822 and define a continuous overridden edge between the subject 822 and the floor scene 174. Then, the border detection engine 808 determines a final boundary between the subject 822 and the floor scene 174 by starting at the overridden edge and working backward from the subject region 942 toward the pure patterned region 944 until it detects a discontinuity in color from the color of the overridden edge.

At the operation 932, the border detection engine 808 determines if there are peaks 832 that have not been analyzed on the edge region 946. If the unanalyzed peaks 832 exist, the border detection engine 808 repeats the operations 922, 924, 926, 928 and 930. If not, the method 920 proceeds to the operation 934.

At the operation 934, the border detection engine 808 generates a second intermediate mask 940. The second intermediate mask 940 is created based upon the analysis of the edge region 946 by the border detection engine 808. Thus, the second intermediate mask 940 is configured to remove at least a portion of the edge region 946 that has been identified as part of the patterned surface 402 of the floor scene 174. Accordingly, the second intermediate mask 940 operates to clearly define the boundaries 826 between the subject 822 and the floor scene 174.

In other embodiments, at the operation 928, the border detection engine 808 operates to define an image histogram of the closed area 952 with respect to the subject region 942. Then, at the operation 930, the border detection engine 808 performs extrapolation within the closed area 952 by using the image histogram defined based upon the subject region 942. In this case, the extrapolation process can begin from the subject region 942 to the pure patterned region 944 to achieve more accurate analysis.

Figure 26:
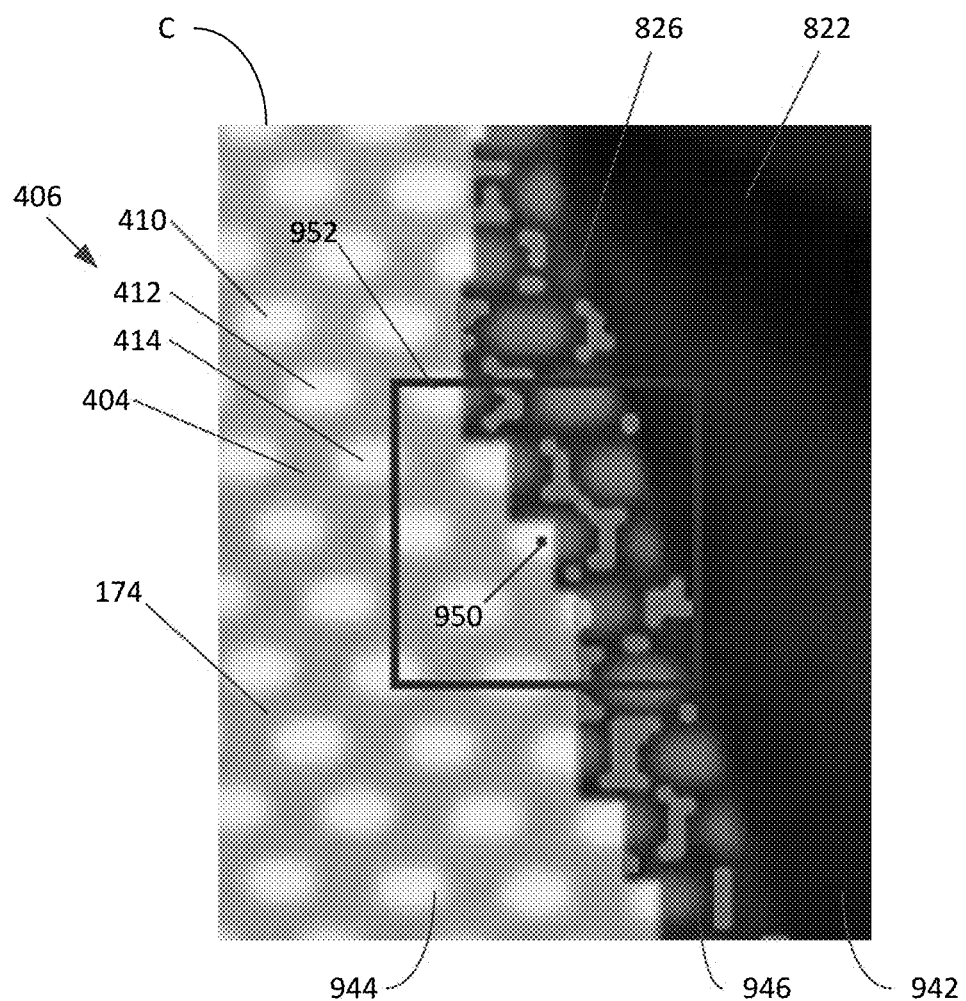
FIG. 26 is an enlarged view of a boundary area of an original photograph, illustrating an example execution of the border detection engine of FIG. 25.

FIG. 26 is an enlarged view of a boundary area C of the original photograph 420 of FIG. 20, illustrating an example execution of the border detection engine 808. As described above, the boundary area C includes a subject region 942, a pure patterned region 944, and an edge region 946.

As discussed above, the subject region 942 and the pure patterned region 944 correspond to the filtered subject region 872 and the filtered pure patterned region 874 in the first intermediate mask 870.

The edge region 946 is a region at or around the boundaries 826 between the subject 822 and the patterned surface 402 of the floor scene 174, and is not clearly identified, by the pattern detection engine 806, as either the floor scene 174 or the subject 822. The edge region 946 corresponds to the unidentified region 876 in the first intermediate mask 870. As described above, the border detection engine 808 is used to determine the characteristics of the edge region 946 and delineate the floor scene 174 and the subject 822.

As described in the operation 924, the border detection engine 808 operates to locate the subject peak 950 at or around the edge region 946.

As described in the operation 926, the border detection engine 808 operates to define the closed area 952 surrounding the subject peak 950.

In some embodiments, the method 920 is not performed for the entire image of the original photograph 420 or the subtraction image 830, but limited only to regions or areas including the edge region 946.

Figure 27:
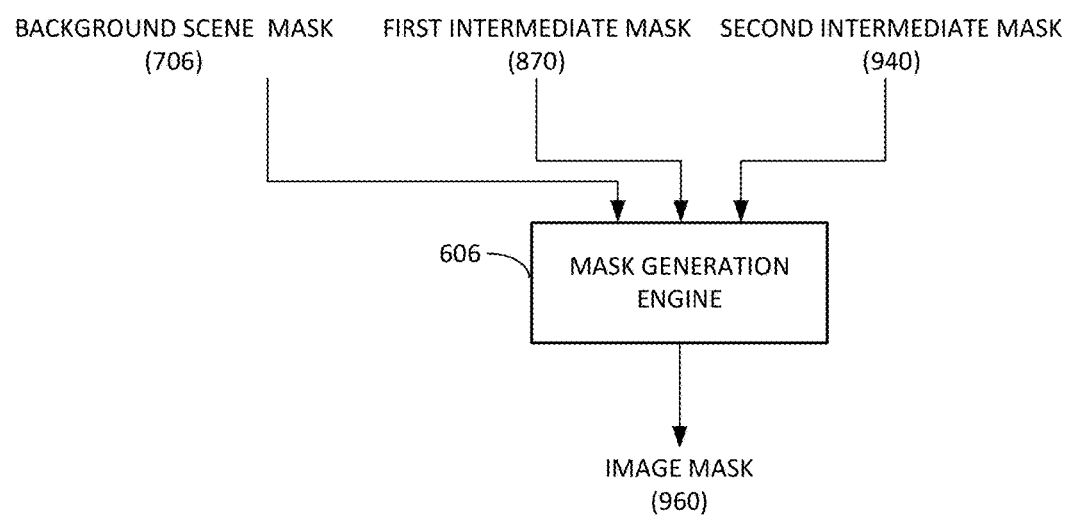
FIG. 27 illustrates an example operation of a mask generation engine.

FIG. 27 illustrates an example operation of the mask generation engine 606 of FIG. 12. In some embodiments, the mask generation engine 606 operates to receive the background scene mask 706, the first intermediate mask 870 and the second intermediate mask 940, and create an image mask 960.

The image mask 960 is configured to pass through the subject 822 and remove the photographic scene 106 from the original photograph 420. Because the image mask 960 is a summation of the background scene mask 706, the first intermediate mask 870, and the second intermediate mask 940, the image mask 960 removes the background scene 172 and the patterned surface 402 of the floor scene 174. In the depicted example, the floor scene 174 includes the patterned surface 402 in its entirety, the entire floor scene 174 is removed from the original photograph 420 when passed through the image mask 960.

In some embodiments, the image mask 960 is processed with a Gaussian blur filter so that the edges of the image mask 960 are softened, and thus the transitions between the subject and the replacement image in the final photograph look continuous and natural.

Figure 28:
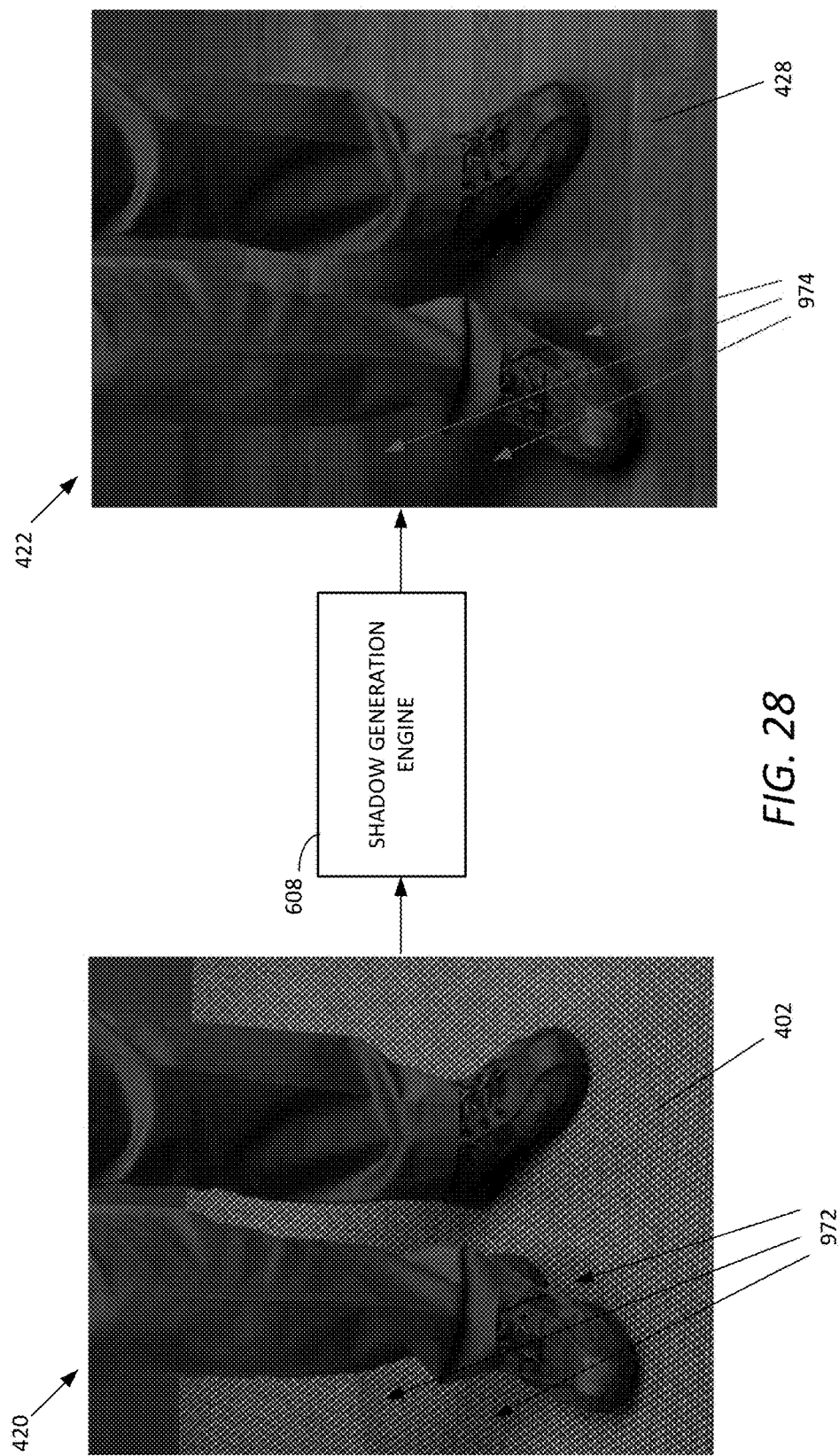
FIG. 28 is a schematic diagram illustrating an example shadow generation engine.

FIG. 28 is a schematic diagram illustrating an example shadow generation engine 608. The shadow generation engine 608 operates to detect original shadows 972 cast on the patterned surface 402 and generate a shadow image 974 used for the final photograph 422. In some embodiments, the shadow image 974 is generated by the shadow generation engine 608 and overlapped on the replacement floor image 428 to produce a natural shadow effect on the final photograph 442.

In some embodiments, the original shadows 972 formed in the original photograph 420 are cast onto the patterned surface 402 that includes the pattern of detectable features 406 (e.g., the dots 410, 412 and 414 with different colors). In these cases, the original shadows 972 are contaminated with the different colors of the pattern of detectable features 406 and thus do not appear to be natural shadows. Accordingly, the shadow generation engine 608 operates to produce natural shadows for the final photograph 442 based upon the characteristics (e.g., the locations, strengths and/or variations) of the original shadows 972. In some embodiments, the shadow generation engine 608 produces the shadow image 974 as a separate file suitable for overlapping with the replacement floor image 428.

Figure 29:
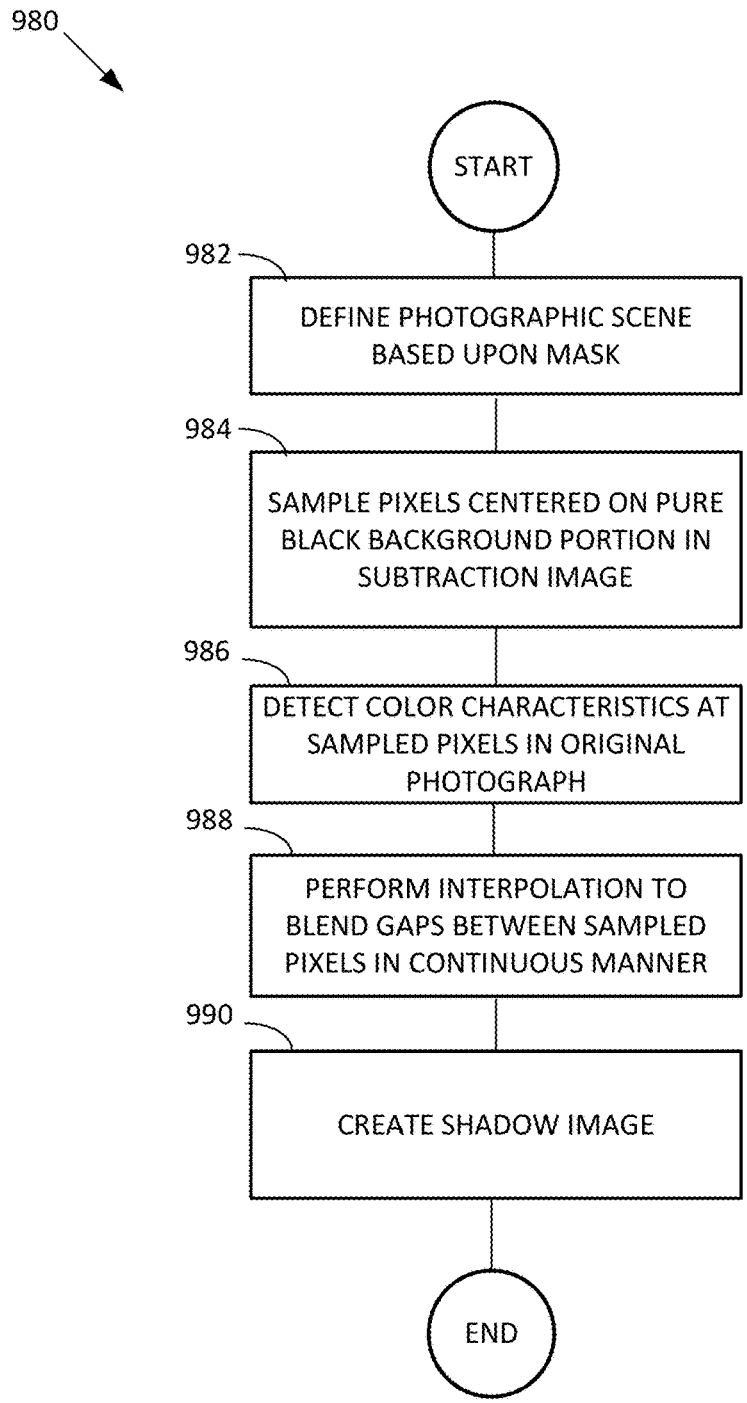
FIG. 29 is a flowchart illustrating an example method for operating the shadow generation engine.

FIG. 29 is a flowchart illustrating an example method 980 for operating the shadow generation engine 608. In some embodiments, the method 980 includes operations 982, 984, 986, 988 and 990.

At the operation 982, the shadow generation engine 608 operates to define the photographic scene 106, which is separate from the subject 822. In some embodiments, the shadow generation engine 608 operates to define the patterned surface 402 of the photographic scene 106. Thus, in the depicted example, the shadow generation engine 608 determines the patterned surface 402 of the floor scene 174.

In some embodiments, the photographic scene 106 is defined by referring to the image mask 960, which separates the subject 822 and the patterned surface 402. In other embodiments, the shadow generation engine 608 refers to the first intermediate mask 870, which defines the filtered subject region 872, the filtered pure patterned region 874, and the unidentified region 876. As described below, in some embodiments, the shadow generation engine 608 operates to consider only the pure patterned region 944 of the original photograph 420.

At the operation 984, the shadow generation engine 608 operates to refer to the subtraction image 830 and sample pixels that are centered on the filtered pure black background portion 846 (e.g., (0,0,0) of RGB values) in the subtraction image 830.

In some embodiments, the shadow generation engine 608 considers only the pure patterned region 944 and chooses the pixels that exist within a region of the subtraction image 830 that corresponds to the pure patterned region 944 of the original photograph 420. This ensures that the shadow generation engine 608 samples pixels of the filtered background portion 846 at an appropriate distance from the subject 822, thereby minimizing the risk that the pixels of the subject 822 are sampled and thus contaminate the shadow image 974.

In some embodiments, the shadow generation engine 608 operates to shrink (or contract) the image mask 960 and use the shrunk image mask as a reference for sampling only the pure patterned region. In this case, in addition to the sampling process illustrated above, the shadow generation engine 608 operates to refer to the shrunk image mask to ensure that a sampled pixel is part of the pure patterned region. The image mask 960 is shrunk to permit the algorithm to only sample the pure patterned region at a distance from the subject, thereby minimizing the risk of sampling the pixels of the subject and thereby contaminating the shadow. In other embodiments, the shadow generation engine 608 operates to blur the edges of the image mask 960 and use it as a reference for sampling only the pure patterned region.

At the operation 986, the shadow generation engine 608 operates to detect color characteristics at the sampled pixels in the original photograph 420. In some embodiments, the shadow generation engine 608 detects the brightness values at the sampled pixels in the original photograph 420 to determine the characteristics of the shadow image 974.

In some embodiments, the shadow generation engine 608 operates to convert the patterned surface 402 of the original photograph 420 to a gray scale so that the shadow image 974 is generated with better quality.

At the operation 988, the shadow generation engine 608 operates to perform interpolation to blend gaps between the sampled pixels in a continuous manner. Because only limited numbers of pixels are sampled for the purpose of generating the shadow image 974, there are pixels with the shadow characteristics (e.g., the brightness values) that have not been detected between the sampled pixels. Thus, the shadow generation engine 608 employs the interpolation analysis to continuously fill the gaps between the samples pixels and produce the shadow image 974 in a natural, continuous manner.

Finally, at the operation 990, the shadow image 974 is produced by the shadow generation engine 608. In some embodiments, the generated shadows are brightened so that the brightest pixel values of the shadows have zero opacity. In some embodiments, the shadow generation engine 608 is operated to adjust the contrast of the shadows based upon desired shadow effects.

In some embodiments, the shadow image 974 is a separate file that can be combined or overlapped with the replacement image 424 to produce the final photograph 422.

Figure 30:
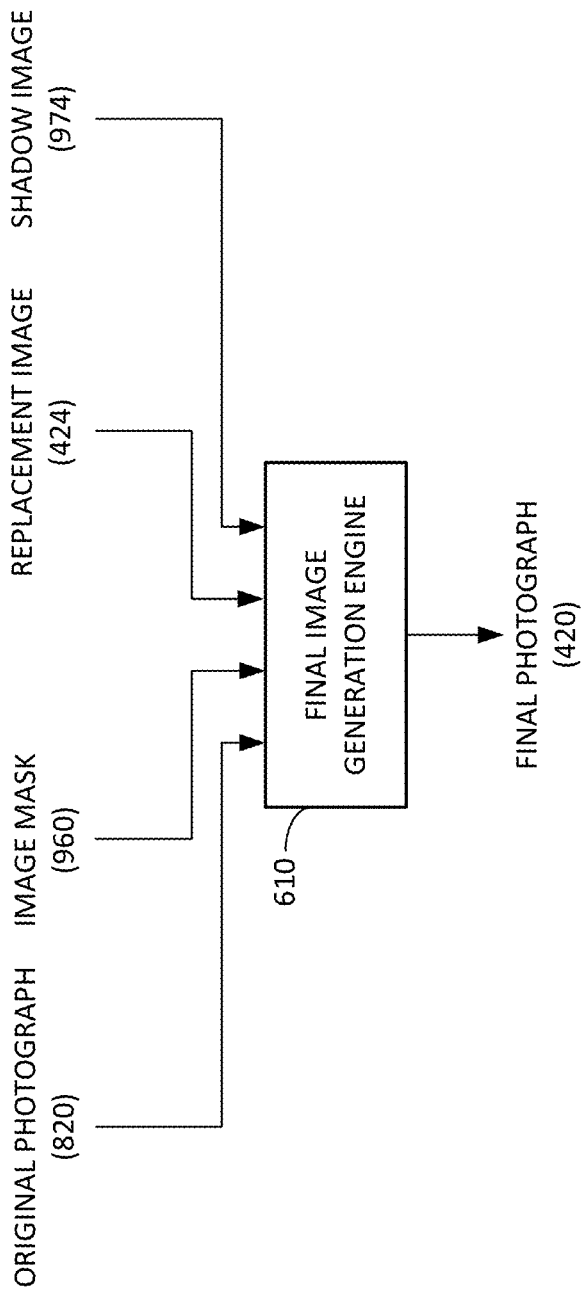
FIG. 30 illustrates an example operation of a final image generation engine.

FIG. 30 illustrates an example operation of the final image generation engine 610 of FIG. 12. In some embodiments, the final image generation engine 610 operates to receive the original photograph 420, the image mask 960, the replacement image 424, and the shadow image 974, and produce the final photograph 422.

In particular, when the original photograph 420 passes through the image mask 960, the photographic scene 106 is removed and the subject 822 is obtained. Then, the obtained subject 822 without the photographic scene 106 is combined or overlapped with the replacement image 424 to produce a photograph of the subject 822 with the replacement image 424. Finally, the shadow image 974 is added to the photograph to produce the final photograph 422, which has the subject 822 with the replacement image 424 and incorporates the shadow image 974.

Figure 31:
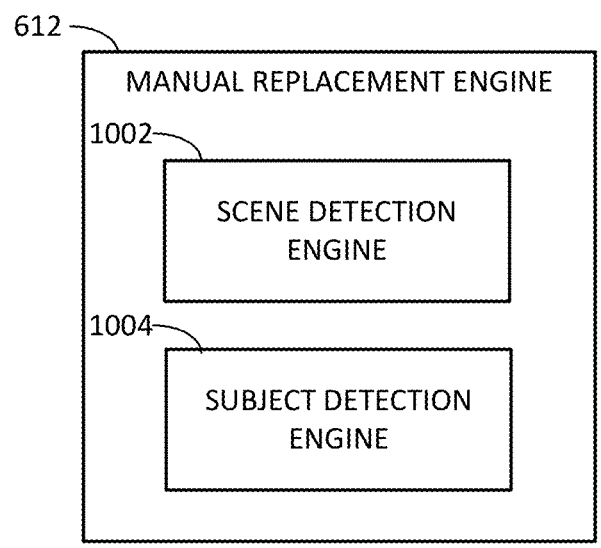
FIG. 31 illustrates an example manual replacement engine.

FIG. 31 illustrates an example manual replacement engine 612. In some embodiments, the manual replacement engine 612 includes a scene detection engine 1002 and a subject detection engine 1004.

As described above, the photographic scene 106 is detected automatically by the operation of the background detection engine 602 and the floor detection engine 604. In some embodiments, however, there may be some areas or regions that have not been sufficiently identified or determined as either the photographic scene 106 or the subject 822 by the automated operations of the background detection engine 602 and the floor detection engine 604. In addition, the final photograph 422 may have some portions that the scene replacement engine 112 has not processed sufficiently to reflect desired effects, and, therefore, need to be modified by additional processes. For example, several factors, such as different lighting sources and the contamination of the photographic scene, may cause unexpected results, such as unnatural shadows, on the final photograph 422. Thus, the manual replacement engine 612 operates to supplement the automated operations of the scene replacement engine 112.

The scene detection engine 1002 operates to manually detect a portion of the photographic scene 106 (including the background scene 172 and the floor scene 174) that has not been sufficiently detected by the background detection engine 602 and the floor detection engine 604. For example, there may be a portion of the patterned surface 402 of the floor scene 174 that is not clearly detected or identified by the floor detection engine 604 at or around the boundaries 826 between the floor scene 174 and the subject 822. In this case, the scene detection engine 1002 operates to determine the undetected portion of the patterned surface as part of the patterned surface 402.

In some embodiments, the scene detection engine 1002 prompts a user or operator to select a closed region incorporating the undetected portion of the patterned surface that needs to be manually modified. The closed region need not be accurately defined or drawn by the operator as long as the undetected portion is incorporated within the closed region. Then, the scene detection engine 1002 operates to run a histogram analysis for identifying the undetected portion as either part of the patterned surface 402 or part of the subject 822.

The subject detection engine 1004 operates to manually detect a portion of the subject 822 when part of the subject 822 has disappeared or been distorted at or around the boundaries 826 by the automated operations of the scene replacement engine 112.

In some embodiments, similarly to the operation of the scene detection engine 1002, the subject detection engine 1004 prompts the operator to select a closed region incorporating the disappeared or distorted portion of the subject that needs to be manually modified. Then, the subject detection engine 1004 operates to run a histogram analysis for identifying and restoring the disappeared or distorted portion of the subject.

In some embodiments, the scene detection engine 1002 and the subject detection engine 1004 are repeatedly and/or alternately performed until the final photograph 422 is obtained that reflects more accurately the original photograph 420 and depicts the boundaries 826 more precisely.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of photographing a subject, the method comprising:
   capturing a digital photograph of a subject and a photographic scene with a digital camera when the subject is arranged between the digital camera and the photographic scene, at least a portion of the photographic scene having a detectable pattern thereon, wherein the pattern of detectable features includes a plurality of dots,
   wherein the photograph scene has a forward end arranged close to the camera and a rearward end arranged away from the camera,
   wherein the plurality of dots in the at least a portion of the photographic scene gradually increase in sizes from the forward end to the rearward end; and
   processing the digital photograph at least in part by automatically detecting the detectable pattern in the digital photograph, to distinguish the subject from the photographic scene in the digital photograph.

2. The method of claim 1, wherein the detectable pattern comprises:
   a background portion having a substantially uniform background color; and
   a pattern of detectable features arranged on the background portion, the detectable features having at least two non-neutral colors different from the background color;
   wherein the patterned surface has a substantially neutral average color.

3. The method of claim 2, wherein the pattern of detectable features includes a plurality of dots arranged at predetermined distances therebetween.

4. The method of claim 2, wherein the pattern of detectable features comprises:
   a plurality of first dots with a first color, the first dots forming a plurality of first rows on the background and spaced apart in each first row at a first distance, and the plurality of first rows spaced apart at a first row distance;
   a plurality of second dots with a second color different from the first color, the second dots forming a plurality of second rows on the background and spaced apart in each second row at a second distance, and the plurality of second rows spaced apart at a second row distance equal to the first row distance,
   wherein the first rows and the second rows are alternately arranged in parallel.

5. The method of claim 4, wherein the pattern of detectable features further comprises:
a plurality of third dots with a third color different from the first and second colors, the third dots forming a plurality of third rows on the background and spaced apart in each third row at a third distance, and the plurality of third rows spaced apart at a third row distance equal to the first and second row distances,
wherein the first rows, the second rows, and the third rows are alternately arranged in parallel.

6. The method of claim 4,
wherein the first dots are dimensioned to gradually change from the forward end to the rearward end to appear to have consistent dimensions when captured by the camera and
wherein the first distance, the first row distance, the second distance, and the second row distance are configured to gradually change from the forward end to the rearward end to appear to have consistent distances when captured by the camera.

7. The method of claim 1, wherein processing the digital photograph at least in part comprises:
detecting the detectable pattern of the photographic scene with an image processing system;
generating, by the image processing system, an image mask configured to remove the detectable pattern from the digital photograph;
masking, by the image processing system, the digital photograph with the image mask to extract the subject from the digital photograph; and
applying, by the image processing system, a replacement image to the masked digital photograph.

8. The method of claim 4, wherein processing the digital photograph at least in part comprises:
locating a subject dot of the dots with an image processing system;
detecting, by the image processing system, a predetermined number of neighboring dots around the subject dot;
detecting, by the image processing system, two matching neighboring dots located at substantially equal distances, but in opposite directions, from the subject dot, the matching neighboring dots having substantially the same color as the subject dot;
detecting, by the image processing system, two non-matching neighboring dots located at substantially equal distances, but in opposite directions, from the subject dot, the non-matching neighboring dots having a different color from the subject dot;
determining, by the image processing system, the subject dot is surrounded by the background portion; and
categorizing, by the image processing system, the subject dot as part of the photographic scene.

9. The method of claim 7, further comprising:
detecting original shadows cast on the detectable pattern of the photographic scene; and
generating a shadow image configured to be overlapped on the replacement image.

10. A system for processing digital photographs, the system comprising:
a processing device; and
at least one computer readable storage device storing data instructions, which when executed by the processing device, cause the processing device to:
detect a detectable pattern in a digital photograph associated with a photographic scene, wherein the pattern of detectable features includes a plurality of dots,
wherein the photograph scene has a forward end arranged close to the camera and a rearward end arranged away from the camera,
wherein the plurality of dots in the at least a portion of the photographic scene gradually increase in sizes from the forward end to the rearward end; and
distinguish the photographic scene from a subject in the digital photograph based at least in part upon the detected pattern.

11. The system of claim 10, wherein the data instructions, when executed by the processing device, further cause the processing device to:
generate an image mask configured to remove the detectable pattern from the digital photograph;
mask the digital photograph with the image mask to extract the subject from the digital photograph; and
apply a replacement image to the masked digital photograph.

12. The system of claim 11, wherein the data instructions, when executed by the processing device, further cause the processing device to:
detect original shadows cast on the detectable pattern of the photographic scene; and
generate a shadow image configured to be overlapped on the replacement image.

13. A photographic scene comprising at least one sheet, formed of one or more materials, including at least one patterned surface, the patterned surface comprising:
a background portion having a substantially uniform background color; and
a pattern of detectable features arranged on the background portion and comprising a plurality of dots, the detectable features having at least two non-neutral colors different from the background color;
wherein the patterned surface has a substantially neutral average color,
wherein the photograph scene has a forward end arranged close to the camera and a rearward end arranged away from the camera,
wherein the plurality of dots in the at least a portion of the photographic scene gradually increase in sizes from the forward end to the rearward end.

14. The photographic scene of claim 13, wherein the substantially uniform background color is selected to sufficiently differentiate the background portion from a subject, the subject arranged between the photographic scene and a digital camera.

15. The photographic scene of claim 13, wherein the non-neutral colors are selected from saturated colors with strong chromatic content.

16. The photographic scene of claim 13, wherein the patterned surface has a substantially neutral average color when the patterned surface including the background portion and the pattern of detectable features appears to have substantially a neutral color when viewed from a perspective of a digital camera.

17. The photographic scene of claim 13, wherein the pattern of detectable features comprises:
a plurality of first dots with a first color, the first dots forming a plurality of first rows on the background and spaced apart in each first row at a first distance, and the plurality of first rows spaced apart at a first row distance;
a plurality of second dots with a second color different from the first color, the second dots forming a plurality of second rows on the background and spaced apart in each second row at a second distance, and the plurality of second rows spaced apart at a second row distance equal to the first row distance, wherein the first rows and the second rows are alternately arranged in parallel.

18. The photographic scene of claim 17, wherein the pattern of detectable features further comprises:

a plurality of third dots with a third color different from the first and second colors, the third dots forming a plurality of third rows on the background and spaced apart in each third row at a third distance, and the plurality of third rows spaced apart at a third row distance equal to the first and second row distances, wherein the first rows, the second rows, and the third rows are alternately arranged in parallel.

19. The photographic scene of claim 17, wherein the first dots are dimensioned to gradually change from the forward end to the rearward end to appear to have consistent dimensions when captured by the camera, and wherein the first distance, the first row distance, the second distance, and the second row distance are configured to gradually change from the forward end to the rearward end to appear to have consistent distances when captured by the camera.

20. The photographic scene of claim 13, wherein the photographic scene comprises a background scene and a floor scene, the background scene having a monochromatic color used for chroma key compositing, and the floor scene having the patterned surface.

21. A photography station comprising:

a digital camera;

a photographic scene configured to be photographed by the digital camera, at least a portion of the photographic scene including a detectable pattern, wherein the pattern of detectable features includes a plurality of dots, wherein the photograph scene has a forward end arranged close to the camera and a rearward end arranged away from the camera, wherein the plurality of dots in the at least a portion of the photographic scene gradually increase in sizes from the forward end to the rearward end; and a computing device comprising:

a processing device; and at least one computer readable storage device storing data instructions, which when executed by the processing device, cause the processing device to:

detect the detectable pattern in a digital photograph associated with the photographic scene; and distinguish the photographic scene from a subject in the digital photograph based at least in part upon the detected pattern.

* * * * *